United States Patent [19]
Lareau et al.

Patent Number: 6,130,705
Date of Patent: Oct. 10, 2000

[54] AUTONOMOUS ELECTRO-OPTICAL FRAMING CAMERA SYSTEM WITH CONSTANT GROUND RESOLUTION, UNMANNED AIRBORNE VEHICLE THEREFOR, AND METHODS OF USE

[75] Inventors: Andre G. Lareau, Bloomingdale; Stephen R. Beran, Mount Prospect; Brian James, Buffalo Grove; James P. Quinn, Gurnee; John Lund, McHenry, all of Ill.

[73] Assignee: Recon/Optical, Inc., Barrington, Ill.

[21] Appl. No.: 09/113,392

[22] Filed: Jul. 10, 1998

[51] Int. Cl.$^7$ .................................................. H04N 13/00
[52] U.S. Cl. .......................... 348/144; 382/107; 382/154; 382/106; 382/108; 356/12; 354/400; 354/81; 244/7; 244/12
[58] Field of Search ........................... 348/144, 145–148; 358/109

[56] References Cited

U.S. PATENT DOCUMENTS

| | | |
|---|---|---|
| 3,945,023 | 3/1976 | Stauffer . |
| 4,004,852 | 1/1977 | Pentecost . |
| 4,267,562 | 5/1981 | Raimondi ................................ 358/109 |
| 4,377,744 | 3/1983 | Mocenter et al. . |
| 4,550,992 | 11/1985 | Ohtsuka et al. . |
| 4,594,610 | 6/1986 | Patel . |
| 4,942,417 | 7/1990 | Miyazawa et al. . |
| 4,959,800 | 9/1990 | Woolley ................................ 364/516 |
| 4,967,218 | 10/1990 | Numako et al. . |
| 5,155,597 | 10/1992 | Lareau et al. . |
| 5,162,831 | 11/1992 | Haraguchi et al. . |
| 5,245,927 | 9/1993 | Ranes . |
| 5,295,643 | 3/1994 | Ebbert et al. . |
| 5,363,165 | 11/1994 | Kawasaki et al. . |
| 5,422,828 | 6/1995 | Choate et al. . |
| 5,617,173 | 4/1997 | Kawasaki et al. . |
| 5,668,593 | 9/1997 | Lareau et al. . |
| 5,692,062 | 11/1997 | Lareau et al. . |
| 5,844,602 | 12/1998 | Lareau et al. ........................... 348/144 |

OTHER PUBLICATIONS

Author: Ronald G. Driggers et al. Title: National imagery interpretation rating system and the probabilities of detection, recognition and identification Published: Optical Engineering, vol. 36 No. 7, Jul. 1997—pp. 1952–1959.

*Primary Examiner*—Andy Rao
*Assistant Examiner*—Shawn S. An
*Attorney, Agent, or Firm*—McDonnell Boehnen Hulbert & Berghoff

[57] ABSTRACT

An aerial reconnaissance system generates imagery of a scene that meets resolution or field of view objectives automatically and autonomously. In one embodiment, a passive method of automatically calculating range to the target from a sequence of airborne reconnaissance camera images is used. Range information is use for controlling the adjustment of a zoom lens to yield frame-to-frame target imagery that has a desired, e.g., constant, ground resolution or field of view at the center of the image despite rapid and significant aircraft altitude and attitude changes. Image to image digital correlation is used to determine the displacement of the target at the focal plane. Camera frame rate and aircraft INS/GPS information is used to accurately determine the frame to frame distance (baseline). The calculated range to target is then used to drive a zoom lens servo mechanism to the proper focal length to yield the desired resolution or field of view for the next image. The method may be performed based on parameters other than range, such as aircraft height and stand off distance.

22 Claims, 7 Drawing Sheets

SIDE OR FORWARD OBLIQUE

SIDE OBLIQUE

AUTONOMOUS ELECTRO-OPTICAL FRAMING CAMERA SYSTEM WITH CONSTANT GROUND RESOLUTION, UNMANNED AIRBORNE VEHICLE THEREFOR, AND METHODS OF USE

BACKGROUND OF THE INVENTION

This invention relates generally to the art of aerial reconnaissance photography, and more particularly to a reconnaissance camera system having an electro-optical imaging sensor or array with zoom lens capability that automatically and autonomously achieves desired ground resolution or field of view objectives for the reconnaissance mission. The invention also relates to a method of using such a sensor to generate images with desired ground resolution, field of view, or image interpretability objectives regardless of the changes in velocity or height of an aerial reconnaissance vehicle incorporating the sensor. The invention also relates to an unmanned aerial vehicle that incorporates the reconnaissance camera system that operates autonomously to meet reconnaissance mission objectives. The camera system can be pre-programmed to capture high resolution images with desired, e.g., constant, ground resolution, field of view or image interpretability value without any human or operator input, for example by use of an up-link to the reconnaissance vehicle.

STATEMENT OF RELATED ART

In aerial reconnaissance, it is frequently desired to have a series of photographs of a terrain of interest taken by an electro-optical or film-type of camera installed in a moving platform such as an aircraft. This is of particular importance for military reconnaissance applications. In military reconnaissance, it is frequently not sufficient to just provide an image of the target itself, but imagery of the surrounding terrain is required as well. This is required to give photo-interpreters, image analysts, mission planners and the pilots themselves knowledge of the terrain, geography, topography and other pertinent information as to how aircraft, unmanned vehicles and weapons (i.e. missiles) should best approach a target to ensure success and, most importantly in today's geo-political environment, minimize collateral damage. Indeed, it is inherent in the fundamental purpose of obtaining a reconnaissance image that has military or strategic value that the image have two distinct properties: (1) the image has sufficient resolution to determine the detailed information necessary, and, at the same time, (2) the image has sufficient field of view for the analyst to locate the target with accuracy and obtain information about adjacent terrain, structures, and/or possible sites of adverse collateral damage. Given the above requirements and the finite size of electro-optical or film type focal planes, image resolution (which is determined by the lens focal length and pixel size) is very frequently traded off against field of view (which is determined by the lens focal length and the focal plane array size). These parameters of image resolution and field of view are fixed for any given focal length lens. Flight line technicians typically pick the best focal length lens which will most closely meet the analysts' needs given the pilots' planned flight profile.

It is also well known in the aerial reconnaissance art that imagery of specific resolution is necessary to perform certain photo interpretation tasks. Different resolution is needed for example to detect an object the size of a car, versus recognize that it is indeed a car and not a truck or van. Even more resolution is needed to identify what type of car it is, or whether it is occupied. The United States has developed the National Image Interpretability Rating Scale (NIIRS, also referred to as IIRS) which defines the image resolution needed to perform certain interpretation tasks that can be assigned to an image. The rating scale used for NIIRS varies from 0 to 9, with image resolution improving roughly by a factor of two as the NIIRS value increases from one number to the next. Within each NIIRS value there are specific detection, recognition and identification tasks which can be accomplished. For example, NIIRS 5 facilitates recognition of radio and radar facilities but only detection of vehicles, rockets and artillery. The General Image Quality Equation (GIQE) is a formula which is used to translate the NIIRS rating to an equivalent resolution in Ground Resolvable Dimension (GRD) measured in meters or feet. An approximate formula for converting Ground Sample Dimension (GSD), which is one-half of the GRD, into NIIRS is as follows: NIIRS=5.75−logGSD (in units of feet)/log2.

Electro-optical imaging arrays are becoming increasingly viewed as the image-recording medium of choice. Such devices are capable of generating high-resolution images, that can be converted into digital form for convenient storage and electronic transmission. Such arrays are typically composed of a large number (upwards of 25 million) of individual photosensitive cells or pixels arranged in row and column fashion in an array. In a charge-coupled device type of sensor, each cell converts incident electromagnetic radiation into electrical charge, which is stored in a potential well in the substrate of the array. The potential wells associated with each individual cell are controlled by sets of conductors on the surface of the array. The voltages on these conductors are generated and controlled such that the electrical charge associated with each cell is collected and read out of the array. The electric charge associated with each cell or pixel unit is digitized and stored in computer memory for display, recording or transmission as the configuration of the system dictates. Thus, the use of electro-optical imaging array has a tremendous inherent benefit in that it allows real-time or near-real time knowledge of what is happening on the battlefield.

More recently, substantial advances in that the art occurred when an electro-optical imaging array-type of camera system was developed that performs forward motion compensation electronically in the detector (i.e. "on-chip"), without using moving parts. In this array, voltage pulses applied to the conductors regulate the ability of the cells to shift charge from one photosensitive pixel to a pixel in an adjacent row. The charge (representing scene information) is transferred row by row at the same speed as the radiation from the scene is moving across the array, such that the image generated by the array will not be blurred under high speed and low altitude aircraft flight profiles. These flight profiles are frequently used for defensive reasons on the part of the aircraft pilots to improve their survivability in a hostile combat zone. This array is described in the Lareau et al. patent, U.S. Pat. No. 5,155,597, assigned to Recon/Optical, Inc., the assignee of the present invention.

A second advance in the art of electronic aerial reconnaissance photography occurred when an electro-optical step frame camera was developed which allowed extremely wide fields of view to be collected around the target in response to the need to not only image the target itself, but achieve a "synoptic" view of the surrounding area. This camera is described in a second patent issued to Lareau et al., U.S. Pat. No. 5,668,593, also assigned to Recon/Optical. The camera system in the '593 patent uses a servo controlled scan mirror and Pechan derotation prism to provide high resolution, image motion compensated, wide field of view imagery.

A third advance in the art of electronic aerial reconnaissance photography is embodied in a third patent issued to Lareau et al., U.S. Pat. No. 5,692,062. The '062 patent describes an electro-optical imaging array that not only compensates electronically for the forward motion of the aircraft, but also for variations in terrain elevation, for example, in the field of view in a side-oblique reconnaissance mode. The ability to perform forward motion compensation and account for these terrain variations represents an improvement over the "flat earth" assumption which was previously made to control the charge motion within the focal plane array, for example, in the first '597 patent of Lareau et al.

The '062 Lareau et al. patent describes the use of correlation techniques applied to sequential digital imagery output from the detector to determine the residual velocity of the image at each motion compensation sector of the focal plane array. This information is then used to modify the motion compensation control parameters such that the charge motion in each section of the focal plane more closely matched the image velocity due to the actual terrain variation in the field of view, resulting in increased image acuity. The correlation algorithm also can be used to derive range information. In one possible embodiment of the present invention, this passively-derived range information can be used to derive focal length settings for a zoom lens in a manner such that GRD, NIIRS or field of view objectives for a series of images of a terrain can be obtained, while simultaneously obviating the need for man-in-the-loop management or control over the camera system.

New requirements for imaging arrays with motion compensation are developing as the cameras systems into which they are employed are adapted for new and emerging platforms. One new application is the Unmanned Aerial Vehicle (UAV). UAVs have been developed by the United States and other countries for military and civilian purposes and are gaining rapidly in their acceptance as a viable mission platform because of their small size, inexpensive procurement and operating cost, limited or no human risk and in some cases, long endurance. However, these advantages also place unique restrictions on the payloads that they carry, including the reconnaissance cameras. In some cases, digitized video cameras (i.e. frame rates of 30 fps) are used to control the flight of the UAV itself. In other cases, the UAV must fly "autonomously", entirely without ground operator control. For example, the United States currently has a program to develop a high altitude endurance UAV that has the capability to take off from California, fly autonomously to the Far East, stay on station for 48 hours continuously taking intelligence quality imagery, and then fly home. Electro-optical cameras of the type discussed above are ideally suited for UAV applications because their digital output can be data linked back to a ground station (perhaps through a satellite relay) for immediate exploitation and dissemination. Two patents describing UAVs for military applications are U.S. Pat. Nos. 5,295,643 and 5,245,927, the contents of each of which are incorporated by reference.

Following the mission and tactics established in the manned reconnaissance community, UAV mission planners and analysts continue to have a need for high resolution and yet wide field of view imagery. In the prior art, this is achieved in man-in-the-loop UAV control systems by incorporating commonly available zoom lens systems onto the reconnaissance cameras. For general wide area surveillance, the lens is commanded (through an "up-link") to its short focal length position to give the widest field of view. When a target of interest comes into view, it is similarly commanded to a long focal length position to increase resolution at the expense of field of view. In this fashion, capabilities approaching those of manned reconnaissance platforms can be achieved from smaller, cheaper and expendable UAVs.

However, in the case of high altitude, long endurance UAVs, the man-in-the-loop up-link control is no longer always available. As a result, the zoom lens system reverts to a fixed focal length system, defeating the purpose and expense of installing it in the first place.

An example of prior art powered zoom cameras is Miyazawa et al., U.S. Pat. No. 4,942,417. The patent discloses a camera having an automatic zoom mode in which a magnification of the object to be photographed on a focal plane of the camera with respect to the size of the film frame is kept constant. The camera operates in response to a measured distance or range between the object and the camera lens. The patent requires a manual intervention to set the initial scale of the zoom magnification by looking through the camera at the principle object and setting the focal length of the zoom lens either through manual or automatic zoom control. As such, the patent is not truly an autonomous system and would not be suitable for an autonomous system or an UAV type of environment.

More recently, the Kawasaki et al. patent, U.S. Pat. No. 5,617,173, describes a camera system having a power zoom lens capable of maintaining a constant image magnification for a series of images for moving objects according to a target focal length formula. The patent uses a means for determining whether and how the object to be photographed is moving relative to the zoom lens.

Additional prior art exists which employ concepts for passively determining range for cameras. The patent to Stauffer, U.S. Pat. No. 3,945,023 describes a range finding device comprising two spatially separated fixed lenses with detectors behind each and electronic circuitry which determines an output signal representative of the distance between the object and the camera. The patent to Pentecost et al., U.S. Pat. No. 4,004,852, describes an automatic ranging device for optical instruments again using two optical lenses and detectors and using electronic correlation. Unlike the present invention, which relates to determining the optimum focal length setting for a zoom lens, both the Stauffer and Pentecost systems use multiple lenses and detector arrangements in order to control the focus of optical instruments and cameras.

Still additional prior art exists for determining passive range to targets using a sequence of images from a moving camera. The patent to Choate et al., U.S. Pat. No. 5,422,828 describes a method and system for using an imaging sensor and a motion sensor and the steps of computing via correlation to determine the range of the object. The correlation is computed between an "expected initial image from a subsequent image" and a "reference template" from the initial image. Unlike the present invention, sensor orientation and displacement changes are determined via the motion detector. The present invention uses precise knowledge of the platform velocity and frame rate to determine displacement and enable an accurate measurement of range.

The present inventors have developed an electro-optical imaging array type of camera which has the capability to adjust its focal length autonomously by means of a zoom mechanism. The camera provides imagery with a constant field of view, ground resolution or NIIRS value based upon an identified target type within the camera field of view.

The values which determine the setting of the lens focal length are derived from the instantaneous aircraft or UAV (i.e. the platform) parameters, such as height, predetermined camera control instructions, and knowledge of either the range to the scene of interest or else the stand off distance as measured along the ground between the aircraft and the scene of interest. The latter parameter may be determined simply by comparing the geographic coordinates of the target in the field of view, a parameter stored in memory, and the point on the earth's surfaces below the aircraft, and computing the distance. Where the geographic coordinate of the target is not known, range information can be obtained either actively or passively. In one possible embodiment, the range to the target can be determined through correlation of a sequence of images taken from the sensor where the spatial separation of the images is provided by the forward motion of the platform. Range information thus calculated is used to adjust the zoom mechanism of the lens for each subsequent frame of imagery, such that the objective of image resolution in the field of view is achieved for each image as the platform proceeds over unpredictable terrain variations.

One major feature of the invention is that the predetermined mission objectives can be expressed in various terms depending upon the specific mission and camera configuration. For example, one application is to control the zoom lens such that a specific GRD is maintained at all times and for all target types (i.e., constant ground resolution). Another application is to control the camera in conjunction with a target cuer, in which the target cuer detects target types within the field of view, and the zoom lens is controlled in order to detect, recognize or identify the target according to a predetermined NIIRS, GRD or field of view parameter for each target type. In manned platforms, manual pilot controls can be used to select various operating modes for the autonomous zoom function based upon real-time or near real-time mission re-tasking.

SUMMARY OF THE INVENTION

An electro-optical camera system is described which provides constant ground resolution imagery under rapidly varying aircraft altitude and attitude changes. The camera system is suitable for installation in a reconnaissance aircraft having a navigation or avionics system determining the velocity, height, aircraft attitude (roll, pitch and yaw) and aircraft position during a reconnaissance maneuver. The camera system comprises an array of photosensitive cells arranged in rows and columns. The cells store pixel information representing a scene of interest when the shutter of the camera is open. Drive and electronic control circuitry is provided for the array for transferring pixel information stored in the cells from row to adjacent row and out of the array and digitizing the pixel information.

In one possible embodiment, the camera system includes a sequential image processor and camera control circuit responsive to the digitized image data output from the camera for computing servo control parameters for a zoom lens mechanism. The sequential image processor computes the range of the object via correlation means using either a default "zone of interest" or specific areas of interest as identified by an external input cueing device, and this range information can be used in a focal length setting algorithm. Other means for obtaining range information can also be contemplated.

Alternatively, for targets having a predetermined and fixed location, the height and stand-off range to the scene of interest can be obtained from the aircraft navigation system and stored information as to the location, and this information used to derive the focal length settings. User inputs for the desired GRD or NIIRS value which is desired to be maintained can be predetermined and stored in a camera control system memory, or derived from preprogrammed instructions based upon the target type which is detected by the cuer.

A third possible method employs a "stadiometric" comparison of identified targets. Range is determined by comparing the image size of the target to that of actual object identified by a cuer or automatic target recognizer. The resulting range information is then used in the focal length algorithm to derive focal length settings to produce imagery having the desired field of view or image resolution.

The proper zoom position (i.e. focal length) of the lens is calculated from the above target range (or height and stand-off distance information) and vehicle position information, and the predetermined image resolution or field of view requirements, in order to achieve the required resolution of the object. The camera control computer and servo control system in conjunction with a the zoom lens adjustment module provides closed loop control over the zoom lens position and also to maintain calibration of the lens for focus and focal length under varying temperature and pressures which might occur during the flight profile. As a result, during the operation of the reconnaissance camera system, the image resolution and FOV are optimized for the entire flight profile automatically, without the necessity for adjustment by on-board pilots, or, in the case of UAV's, ground control systems via an up-link.

A method is also described for autonomously imaging a scene with a reconnaissance camera system in a manner so as to continuously generate successive images of the scene meeting field of view, resolution, or image interpretability rating objectives for the images. The aerial reconnaissance camera system is installed on board a reconnaissance vehicle and comprises an electro-optical imaging array, a zoom lens, and a camera control system for the array and zoom lens. The method is particularly useful where the geographic coordinates of the scene of interest are not precisely known in advance, such as where the target of interest is a moving object on the ground. The method comprises the steps of:

a) generating first and second successive images of the scene with the electro-optical imaging array and storing the images in a memory system;

b) supplying vehicle information to the camera control system from a navigation system on board the aerial reconnaissance vehicle and responsively correlating the first and second successive images to generate range information between the imaging array and the scene;

c) retrieving information stored in the camera control system as to field of view, resolution, or image interpretability rating objectives for imagery to be generated by the imaging array; and d) processing the information as to the field of view, resolution, or image interpretability rating objectives, together with the range information derived from correlation of the first and second images and navigation information for the reconnaissance vehicle, to generate commands for a zoom lens drive system so as to adjust the focal length of the zoom lens such that the field of view, resolution, or image interpretability rating objectives are achieved in a successive image generated by the array.

An alternative method can be used where the geographic location of the scene of interest is known and stored in the memory system of the camera control computer. The method comprises the steps of:

(a) storing in the camera control computer memory GRD, NIIRS or field of view objectives for the images to generated in the scene of interest;

(b) deriving information as to the vehicle height and position relative to the scene of interest, such as from the aircraft navigation system (this may be accomplished by comparing the geographic location of the scene of interest with the location of the aircraft above the earth's surface to determine the stand-off range to the scene of interest, or using range information derived from either active or passive methods);

(c) calculating a focal length setting for a zoom lens for the array to meet the GRD, NIIRS or field of view objectives for the scene from information as to vehicle's position relative to the scene obtained in step (b);

(d) adjusting the focal length of the zoom lens in accordance with the calculations made in step (c); and (e) exposing the array to the scene to generate an image of the scene of interest, whereby the image meets the objectives for the imagery.

This method may further include subsequent steps of exposing the array to the scene of interest in a series of images, each image meeting the GRD, NIIRS or field of view objectives for the scene of interest. It will be appreciated that the above method can be practiced in a completely autonomous fashion.

In another aspect of the invention, an unmanned aerial reconnaissance system capable of generating successive images of a scene meeting field of view, resolution, or image interpretability objectives without real-time operator involvement is provided.

The system includes a reconnaissance vehicle having a navigation system and a means of propulsion capable of flying the vehicle without on-board human operation in a reconnaissance mission. The system further includes an aerial reconnaissance camera system installed aboard the unmanned vehicle comprising an electro-optical imaging array comprising an array of pixel elements arranged in a plurality of rows and columns. A zoom lens system, comprising a zoom lens for imaging a scene external of the aircraft onto the imaging array and a drive system for adjusting the focal length of the zoom lens is also provided. The system includes a camera control system for the imaging array and the zoom lens system.

The camera control system includes a memory storing information as to field of view, resolution, or image interpretability rating objectives for imagery generated by the imaging array and a camera control computer receiving (a) aircraft navigation generated by said navigation system and (b) range-to-scene information from a source of range information on board the aircraft. The camera control computer further comprises a zoom lens adjustment circuit or module generating commands for the drive system for the zoom lens. The focal length of the zoom lens is adjusted in response to the range-to-scene, or height and stand-off range information, received by the camera control computer and the imagery objective information stored in the memory. The zoom lens is commanded to focal length positions that achieve the desired GRD, IIRS or field of view objectives for the imagery generated by the array. By virtue of the use of actual range information in the zoom lens commands, the zoom lens accounts for or compensates for changes in attitude and altitude of the reconnaissance vehicle between initial expected values during exposure of the array and the actual altitude and attitude. Further, the GRD, IIRS or field of view objectives may be obtained without real-time operator involvement.

In a preferred embodiment, the camera control system further comprises a memory storing first and second successive images of the scene generated by the imaging array. The range-to-scene information is obtained by a sequential image processor circuit. The sequential image processor circuit executes a correlation algorithm on the first and second successive images to generate range information in a passive manner.

BRIEF DESCRIPTION OF THE DRAWINGS

The detailed description of the preferred embodiment of the invention will be described in conjunction with the appended drawings, in which like reference numerals depict like elements in the various views, and in which.

DETAILED DESCRIPTION OF THE PREFERRED AND ALTERNATIVE EMBODIMENTS OF THE INVENTION

I. Overview and General Discussion

Figure 1:
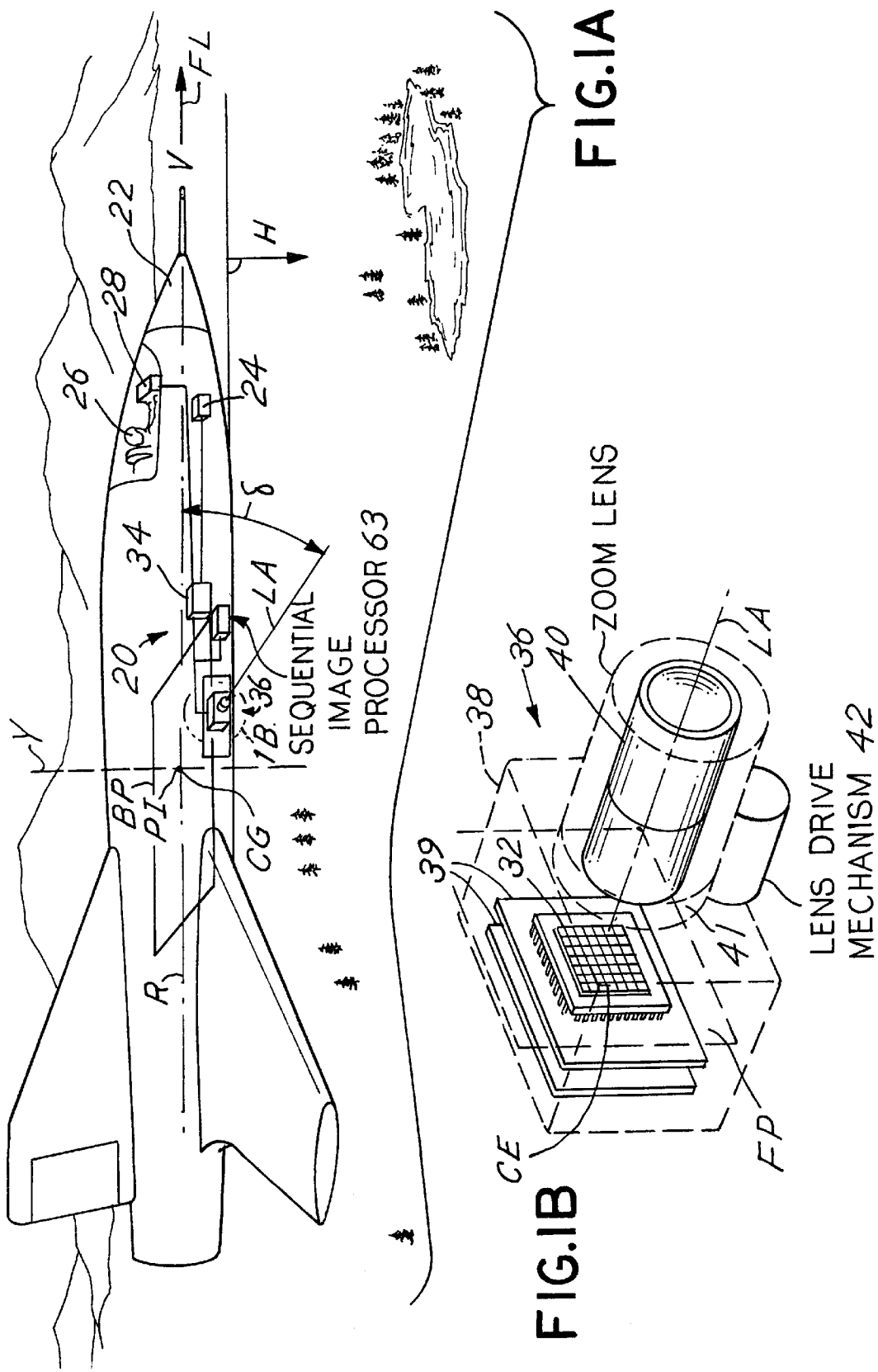
FIG. 1A is an illustration of a reconnaissance aircraft (22) performing a reconnaissance mission with the aerial reconnaissance camera (36) taking a series of frames of imagery in a side oblique orientation. The camera system installed in the aircraft performs autonomous calculations of the range to the target and sets the focal length of the zoom lens to yield a desired resolution or field of view for imagery generated by an imaging array in the camera system in accordance with the techniques described herein.
FIG. 1B is a detail illustration of the camera system of FIG. 1A, showing major component assemblies such as the camera body (38), zoom lens (40), lens drive mechanism (42), focal plane array (32) and electronic circuit boards (39).

FIG. 1A is an illustration of a reconnaissance aircraft 22 performing a reconnaissance mission. An aerial reconnaissance system 20 including a camera system 36 is installed inside the aircraft 22, and is shown taking a series of frames of imagery in a side oblique orientation. In accordance with one possible embodiment of the invention, the camera system 36 performs calculations of the range to the target from previous frames of imagery. The camera control computer 34 sets the focal length of a zoom lens in the system 36 to yield imagery having a constant ground resolution, field of view or NIIRS objectives in accordance with the techniques described herein. Additionally, the camera system includes an imaging array that performs forward motion compensation. The manner in which forward motion compensation is achieved is not particularly important, and can be by any of several known methods.

The aircraft 22 defines orthogonal roll, pitch and yaw axes R, PI and Y, respectively, each passing through a center of gravity CG. The roll and pitch axes define a bilateral plane BP that is horizontal during level flight. The camera assembly 36 includes a zoom lens defining a lens axis LA that can be directed towards a scene of interest. The focal length of the zoom lens is adjustable by a zoom lens drive system and zoom lens adjustment circuit module described below.

The aircraft 22 has an avionics system 24 which provides to the system 20 input signals indicating the aircraft ground velocity V, aircraft height above ground H and aircraft roll, pitch and yaw angular position data. From console 28, an operator 26 provides additional inputs into the system in a manned vehicle embodiment, such as the camera depression angle δ between the lens axis LA and the bilateral plane BP. The inputs from the console 28 and avionics 24 are fed to a camera control computer 34 which processed the data, together with pre-flight programmed information and mission parameters for field of view, GRD or NIIRS performance, and responsively generates control signals for the camera assembly, zoom lens and imaging array.

Referring to FIG. 1B, the camera assembly 36 includes an imaging array 32 defining a focal plane FP having a center point CE. The camera assembly 36 also includes a housing 38 and a zoom lens 40 having a focal length F, defining the lens axis LA that passes through the center point CE. Aperture plane AP passes through the aperture of lens 40 perpendicular to the lens axis LA. A shutter 41 is provided to selectively expose the array 32 to radiation from the scene. Typically, the housing 38 is isolated from the aircraft 22 in order to reduce vibration or other high frequency, low amplitude motions. Printed circuit cards 39 incorporate the electronics that support operation of the array 32.

The embodiment of FIG. 1A shows the camera installed in a manned reconnaissance vehicle 22. As noted above, the invention is also suitable for installation in an unmanned aerial reconnaissance vehicle. In the UAV embodiment, the camera control computer 34 is coupled to the avionics system of the UAV and receives position (e.g., GPS) data, vehicle height and velocity data, and attitude data (e.g., roll, pitch or yaw angles). In both embodiments, the camera control computer will have a memory storing predetermined system parameters such as pixel size, array size, etc., as well as imagery objectives in terms of field of view or resolution in terms of GRD or NIIRS, either in general for the mission or for particular targets that may happen to be in the field of view.

In a preferred embodiment of the invention, the camera system 36 is one that is essentially completely autonomous. In particular, the camera system does not require human involvement to adjust operational parameters of the camera system, such as require human involvement to adjust the focal length of the lens or field of view in response to changes in the aircraft velocity, height, or range to the target, in order to meet mission objectives.

The electro-optical imaging array or sensor 32 comprises a plurality of pixel elements arranged in rows and columns. For example, a full frame Charge Coupled Device (CCD), C-MOS detector, discrete diode array, interline transfer CCD, or other similar electro-optical imaging sensor is suitable. Preferably, the array includes at least 4 million pixel elements, with 25 to 50 million pixels being a preferred embodiment. A presently preferred imaging array for the camera system is the rectangular CCD array described in detail in the Lareau et al. U.S. Pat. No. 5,692,062 or Lareau et al. U.S. Pat. No. 5,155,597, which are incorporated by reference herein. The imaging array further includes the appropriate clocking circuitry known in the art to move pixel information in the array from one pixel to an adjacent pixel during the exposure of the array to the scene in order to prevent blurring of the image due to image motion in the plane of the array. A further possible array architecture is described in the pending patent application of Lareau et al., "Electro-Optical Imaging Array With Two-Axis Image Motion Compensation", Ser. No. 08/646,509 now U.S. Pat. No. 5,798,786, which is incorporated by reference herein. The array substrate is made from a material sensitive to particular wavelengths of interest, such as the near infrared, visible spectrum, or thermal spectrum.

The camera system further includes a zoom lens system for the array 32. The zoom lens system includes a zoom lens 40 that images a scene external of the reconnaissance vehicle onto the imaging array 32. The zoom lens system also includes a servo-controlled zoom lens drive system 42 for adjusting the focal length of the zoom lens. A presently preferred zoom lens system is described in detail further below.

The camera system further includes a camera control system for the imaging array 32 and the zoom lens system 40/42. The camera control system includes a memory (not shown in FIGS. 1A and 1B) storing, among other things, information as to field of view, resolution, or image interpretability rating objectives for target imagery to be generated by the imaging array. For example, pre-programmed mission objectives for the reconnaissance mission, such as NIIRS 6 for ten frames of imagery of a particular target located at a known position on the earth's surface, may be stored in the memory. The camera control system further includes the camera control computer 34 that receives aircraft navigation data generated by a navigation system on-board the reconnaissance vehicle, such as global positioning system (GPS) data giving the aircraft's position above the earth's surface, and vehicle velocity and height information.

In a preferred embodiment, the camera control computer 34, or alternatively, the sequential image processor circuit 63, determines the range from the aircraft to the scene imaged by the array. This is particularly useful where the geographic location of the scene of interest is not known in advance. This range information can be obtained either actively from a laser range finder, radar or similar apparatus, or, more preferably, using passive techniques such as those described in detail in the Lareau et al. '062 patent. The camera control computer 34 responsively generates commands for the imaging array 32 so as to control the exposure of the array and the transfer of pixel information in the array to compensation for forward motion of the aircraft.

The camera control system further includes a zoom lens adjustment circuit or module that generates commands for the zoom lens drive system so as to adjust the focal length of the zoom lens. The zoom lens adjustment circuit may be implemented in software in the camera control computer 34 or in discrete hardware, or in a combination of the two. The zoom lens adjustment circuit is responsive to the range-toscene information, or aircraft height and stand-off distance information, aircraft navigation inputs obtained by the camera control computer, and the information stored in the computer system memory as to the imagery objectives for the mission. Based on this information, the zoom lens adjustment circuit implements a focal length algorithm and commands the zoom lens drive system 42 so as to change the focal length of the zoom lens 40 in a manner that preserves the field of view, ground resolvable distance or NIIRS objectives for the imagery.

Additionally, the commands for the zoom lens drive system 40/42 are based on actual flight parameters (e.g., actual values of velocity, height and range to target), and are not based on assumptions on the flight path of the reconnaissance vehicle. Accordingly, the zoom lens focal length, and resulting resolution and NIIRS values are accurate. The system thus can account for differences in the attitude and altitude of the reconnaissance vehicle between the actual flight values during exposure of the array to the scene and the anticipated values (e.g., range, stand-off distance or height, mission parameters generally determined in advance). Therefore, if the aircraft has to deviate from its flight plan, for example due to the presence of clouds, threatening surface to air defenses, or other conditions, the camera system adapts to the changing conditions while still obtaining imagery that meets the mission requirements. As such, the system is more flexible than a camera system with a fixed focal length lens. Additionally, because the proper focal length settings can be determined autonomously, it provides additional flexibility to the choice of platforms and enables the camera system to implemented in an fully autonomous unmanned aerial vehicle.

In accordance with the above features of the system, the camera control computer 34, zoom lens adjustment circuit, and electro-optical imaging array 32 cooperate together to produce an image from the imaging sensor meeting the field of view, resolution, or image interpretability rating objectives without regard to changes in altitude or attitude of said reconnaissance vehicle from initial or expected values. Imagery having the field of view, resolution, or ground-resolvable distance objectives may be obtained without real-time operator involvement. Preferably, the array and camera system are operated to generate a series of images of the scene of interest as the aircraft flies past, each one meeting the imagery objectives for the scene of interest.

The camera control computer 34 also preferably implements a target cuer program that processes imagery immediately after it is generated by the imaging array 32 and processed by imaging processing circuitry. The target cuer program is an image recognition program, in which the target cuer detects target types within the field of view of the camera system. Persons skilled in the art are familiar with cuer programs. When certain target types are identified as being in the field of view, such as an air strip, missile silo, armored vehicle or tank, etc., the target cuer looks to the camera system memory to determine the appropriate field of view, GRD or NIIRS value required for the imagery of the identified target. The target cuer then supplies this new GRD, NIIRS or field of view parameter to the zoom lens adjustment circuit. New focal length positions are determined and the drive mechanism 42 is operated to control the zoom lens 40 to achieve the desired level of imagery performance for the target type.

In one embodiment of the invention, the camera system may be installed in a conventional manned reconnaissance vehicle or aircraft. In an alternative embodiment of the invention, the entire camera system, including array, camera control computer, zoom lens, etc. is installed in an unmanned airborne vehicle or UAV. UAVs are per se known in the art. Two representative patents describing UAVs are Ebbert et al., U.S. Pat. No. 5,295,643 and Ranes, U.S. Pat. No. 5,245,927, both of which are incorporated herein by reference. Aside from a suitable propulsion system, such vehicles include an avionics system that generates the velocity, height and position data that can be used by the camera system to generate imagery meeting resolution, field of view or image interpretability objectives without operator involvement.

For example, the camera system described herein is installed in the payload compartment of the UAV and the camera control system is interfaced with the vehicle's avionics system so as to receive attitude, position, velocity and height data of the UAV. The memory of the camera control system is programmed with imagery objectives, such as field of view or ground resolvable distance objectives for a series of images of a target over hostile terrain. The UAV flies over the terrain of interest. When the UAV is positioned relative to the earth such that the scene of interest is in the field of view, the array or sensor is exposed to the scene of interest. Range to scene information is obtained from sequential images generated by the array (such as in the manner described in the Lareau et al. '062 patent), or through other passive or active means. Alternatively, vehicle height and stand-off distance can be computed from aircraft GPS data, stored information as to the geographic location of the scene of interest. The camera control computer uses this information, along with the current attitude and height data of the UAV, along with the imagery objectives stored in memory, to derive commands for the zoom lens drive system. The zoom lens drive system moves the zoom lens from one position to another so as to maintain a constant field of view or resolution objective as the camera system generates sequential images of the scene. Additionally, the target cuer may cooperate with the camera control computer and zoom lens adjustment module to adjust the imagery objectives if particular target types are detected in the field of view.

Note that in the above UAV embodiment of the invention, the need for a man-in-the-loop up-link to command the zoom lens servo to change the field of view is completely avoided. Thus, the present invention is particularly suitable for high altitude, long endurance reconnaissance missions. The present UAV embodiment of the invention permits such a mission to have the additional advantage of dynamic field of view and resolution adjustments to achieve mission objectives (such as preservation of a particular field of view or resolution objective), through autonomous control of a zoom lens for the camera system. Further, the autonomous control of the zoom lens and resulting improvements in imagery can be obtained in the UAV in a completely passive manner from successive frames of imagery.

II. Detailed Discussion of a Preferred Implementation of the Invention

Electro-Optical Imaging Array 32

Figure 2:
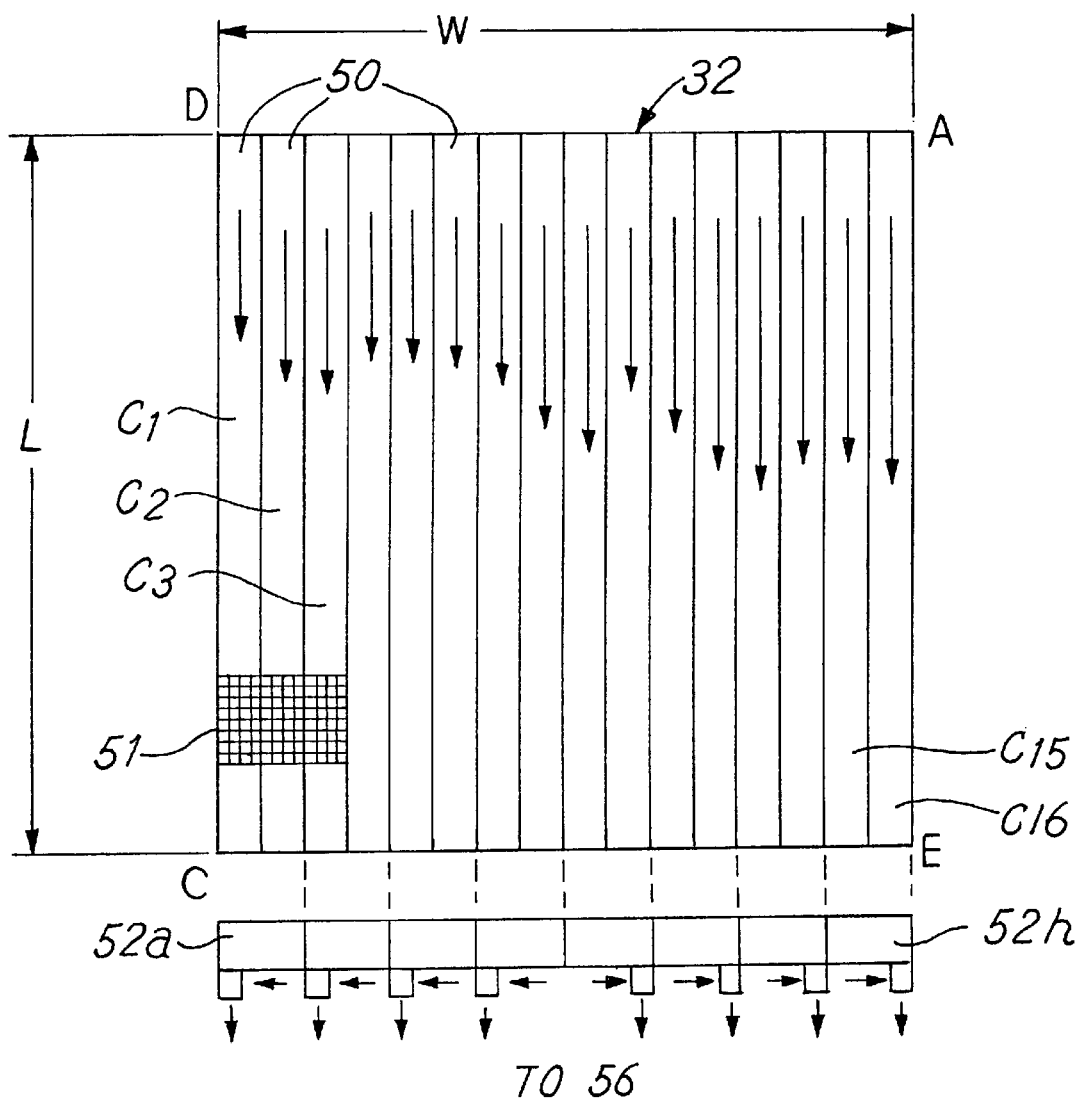
FIG. 2 is a schematic representation of the focal plane array (32) of FIG. 1B.

Referring now to FIG. 2, one possible embodiment of the imaging array 32 is shown in a plan view. Points A, B, C and D indicate the boundary of the image of the scene on the array 32. The width W of the array is preferably 48–60 mm and represents 4,000 to 6,000 pixels. The length L of the array is also 48–60 mm and represents 4,000 to 6,000 pixels. Only a few of the pixels 51 are shown schematically in FIG. 5.

The pixels of the array 32 are divided into rows and columns, and the columns, in turn, are organized into a plurality of column groups 50 in order to accomplish graded image motion compensation when the camera is oriented in a side-oblique scenario. The number of column groups selected may vary depending on the operational parameters of the system, the degree of resolution, and the desired cost to performance ratio. Sixteen column groups have proven to be satisfactory. Each of the column groups has its own charge transfer rate in order to achieve a substantial synchronism between the image motion rate and the charge transfer rate in a side oblique reconnaissance scenario. The counter and clock driver circuitry for the array in the drive and control electronics 54 of FIG. 4 transfers pixel information in the column groups independently so as to compensate for different rates of image motion when the imaging array is oriented in a side-oblique orientation relative to the reconnaissance vehicle. This technique of graded image motion compensation is described in the Lareau et al. '597 patent and will not be described further. A variation of this technique may also be used, in which terrain variations in the scene of interest are accounted for in determining the pixel information transfer rates in the several column groups, is described in the Lareau '062 patent and therefore will not be described further.

Alternatives to the above-referenced image motion compensation techniques may be employed, and the present invention should not be considered limited to the purely electronic versions described above. For example, a moving shutter or slit system, or rotation prism or mirror technique may be used without departure from the invention. For example, the array may be organized as a single column group and all columns of pixels transferred at the same rate. In order to prevent image blur, a narrow slit shutter is scanned across the array and the rate of charge motion through the array is increased as the slit moves across the array. These mechanical or electro-mechanical solutions to image motion compensation are considered less preferred.

In the representative example of FIG. 2, each column group 50 has its own separate variable and adjustable charge transfer rate, measured in units of pixels per second, which is adjusted between successive frames to approximate the actual image motion rate in that portion of the array. Sequential imagery from a portion of the column group is used to derive the charge transfer rate that is appropriate for that column group, and the actual range to scene information. The portion of the column group that is used by the signal processing circuitry to calculate the image velocity, charge transfer rate, and range to scene is a matter of choice. The center of the column group can be chosen as a default zone of interest, or the left hand column of pixels may be used. Alternatively, the target cuer may dictate that a particular group of pixels in the array be selected. The variable charge transfer rates are shown in FIG. 2 as arrows, with the length of the arrow intended to represent the relative transfer rate with longer arrows indicated faster rates.

In a preferred embodiment, a correlation algorithm is applied to successive images generated by the array, with the correlation algorithms applied to imagery in each of the column groups. The correlation algorithm produces range to scene information from the two images. By conducting the correlation algorithm in each of the column groups, range to scene information is obtained for terrain imaged in each of the column groups, thus range can be determined to a multitude of longitudinal strips of terrain in the scene of interest, the strips oriented parallel to the line of flight. Such range information would be particularly useful in deriving focal length commands for the zoom lens where the actual geographic location of the target of interest is not known in advance, such as the case with a target capable of movement, or when the aircraft comes across a target that it does not have pre-stored information as to the geographic location of that target.

The correlation of sequential images to determine charge transfer rates for the particular column groups is performed in parallel for all the column groups. Thus, after the read out of the second image, the correlation algorithm produces a set of charge transfer rates for all the column groups in the array. When the array is exposed to the scene for generation of the third image, the charge transfer rates are precisely matched for each of the column groups, producing crisp, clear imagery from the array throughout the array. CCD or equivalent arrays that have small pixel sizes, a large number of pixels, a high fill factor, and effective image motion compensation, such as described above, are capable of producing very high resolution digital images.

Several alternative correlation algorithms for generating the charge transfer rates for the column groups of the array are described in the Lareau '062 patent, and the reader is directed to the Lareau et al. '062 patent for detailed explanation. The correlation algorithm, when applied to successive images as discussed in the Lareau et al. '062 patent, also produces range information in each of the column groups. This range information can be used by the camera control system in the manner described below to generate commands for the zoom lens system 40/42 so as to achieve field of view, GRD or IIRS objectives for the third and successive images generated by the array.

Further details on the array structure will be apparent to persons of skill in the art and are described in the patent and technical literature. Such details are not considered pertinent to the invention. The general reader is directed to the Lareau et al. '597 patent for a detailed description of the construction of a CCD imaging array.

Zoom Lens System

The zoom lens system includes a zoom lens assembly 40 and the mechanical drive mechanism 42 (FIG. 1B) for moving the zoom lens elements in a manner so as to adjust the focal length of the lens. While many zoom lens designs may be used for this purpose, we describe herein a presently preferred design for the illustrated embodiment. It will be appreciated that the following design has been arrived at after taking into account certain cost to performance tradeoffs that may vary depending on the type and size of the array, desired field of view or other performance objectives, intended type of reconnaissance mission (tactical vs. LOROP) etc. Accordingly, the invention is of course not limited to the following preferred optical design.

A. Optical Design
The specifications for the preferred design are as follows:

| | |
|---|---|
| Zoom Range: | 4.5X (continuous) |
| Focal Length: | 3.33 to 15.0 inches |
| Relative Aperture: | f/6 |
| Detector Type: | Silicon CCD, detector pitch of 0.012 mm × 0.12 mm |
| Detector Array Size: | 2.38 inches × 2.38 inches |
| Operating spectrum: | 550 to 850 nm, Sunlight −5,500° K., silicon detector response, OG515 Schott glass filter with 900 nm cutoff coating, filter in lens assembly |
| Detector array window: | 0.080 inches, BK7 |
| Focal plane resolution: | 41.7 cyc/mm |
| MTF Performance: | 50 minimum at 41.7 cyc/mm at all zoom positions |
| Operating Altitude: | 0 to 30,000 feet with all internal air spaces vented to ambient pressure. |

Field of View

TABLE 1

| Position | Focal Length | Field of View |
|---|---|---|
| 1 | 3.33 inches | 39.3 degrees × 39.3 degrees |
| 2 | 4.00 inches | 33.1 degrees × 33.1 degrees |
| 3 | 6.50 inches | 20.7 degrees × 20.7 degrees |
| 4 | 10.00 inches | 13.6 degrees × 13.6 degrees |
| 5 | 15.00 inches | 9.1 degrees × 9.1 degrees |

Obviously, the above table can be interpolated to arrive at the necessary focal length to achieve any desired field of view between the extremes of 39.3 degrees and 9.1 degrees. Such a table of values is stored in the memory for the camera control computer 34 and accessed by the zoom lens adjustment module implemented in the camera control computer, or else a program is run in real time to determine the focal length for the zoom lens based on desired field of view for the scene or target of interest.

Overall length: 24.0 inches from front vertex to image plane.

Lens Diameter: 10 inches (lens barrel diameter, not including any zoom drive mechanism.

Figure 3A:
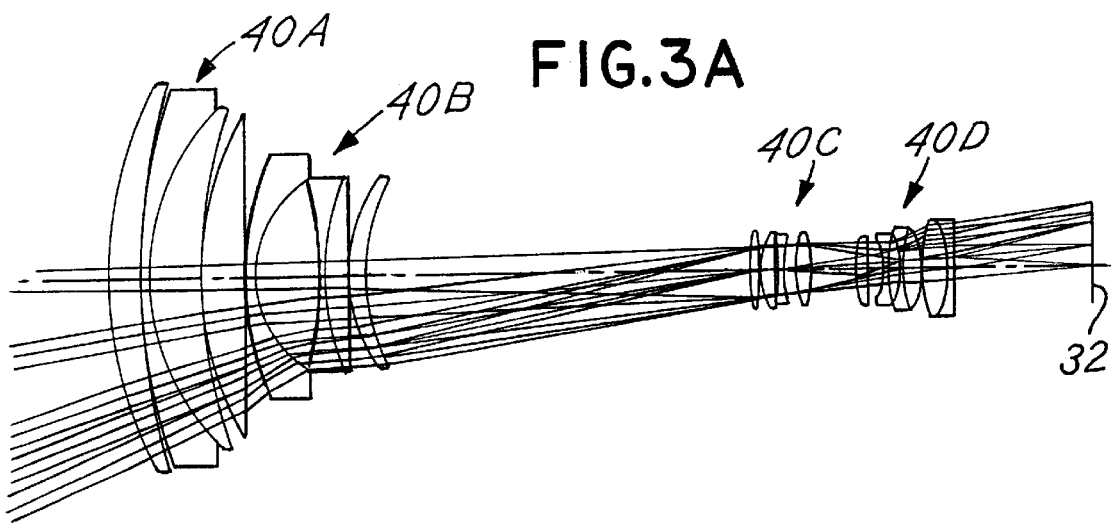
FIGS. 3A, 3B and 3C are illustrations of the zoom lens assembly (40) of FIG. 1B, showing the position of the movable lens elements (40B, 40C and 40D) at three different positions.
Figure 3B:
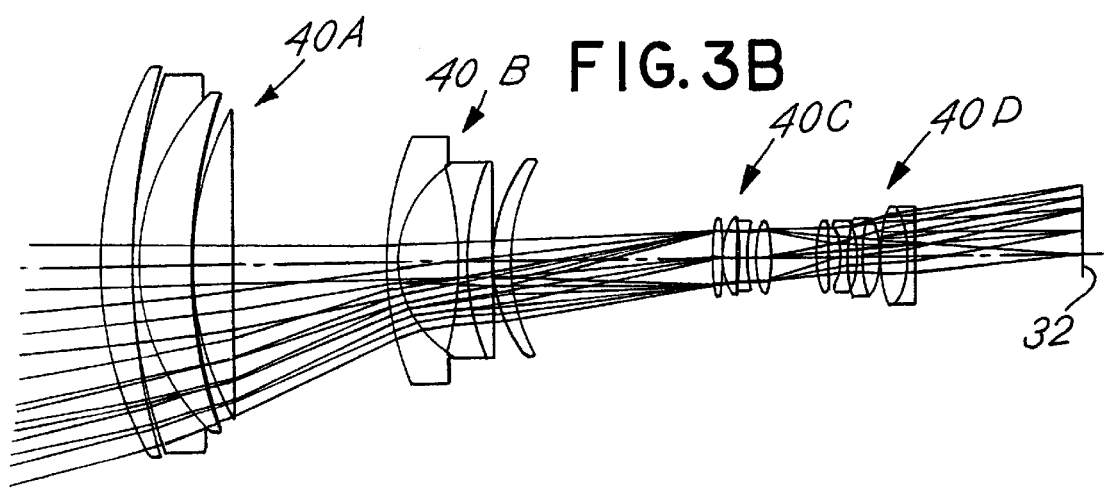
Figure 3C:
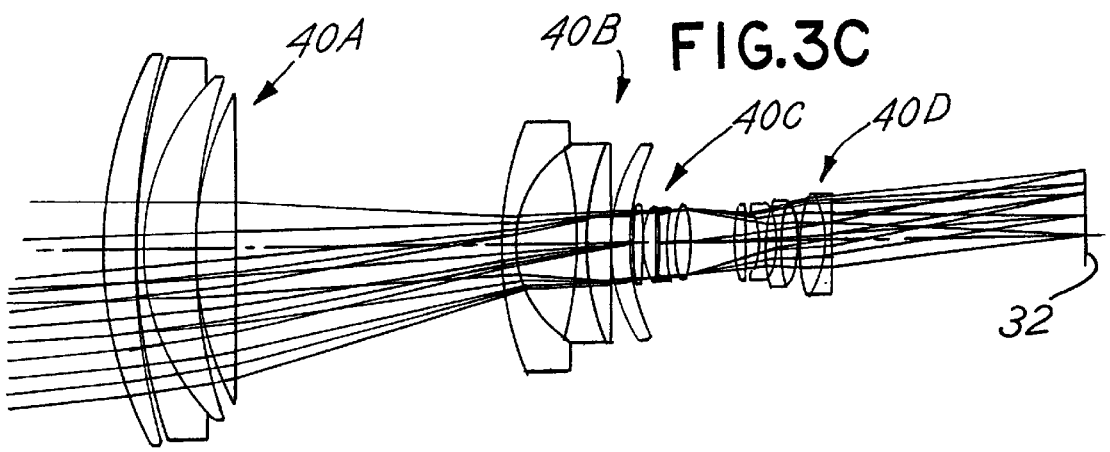

FIGS. 3A, 3B and 3C illustrate the groups of optical elements 40A, 40B, 40C and 40D of the zoom lens 40 and the ray paths for incident radiation when the moveable group of lenses are at positions 1, 3 and 5 of Table 1. The zoom lens includes a first group 40A of optical elements receiving incident radiation. The first group of optical elements remains fixed with respect to the camera housing and imaging array. The moveable group of optical elements 40B, 40C, 40D move back and forth along the optical axis of the lens 40 to various intermediate positions. When the moveable groups of lenses are at their innermost position as shown in FIG. 3C, the field of view of the zoom lens 40 is set to the amount set forth in the table above and the lens 40 has its maximum focal length.

The group of lenses 40C and 40D comprise conventional image forming and focusing lenses.

Further details on the lens design are considered conventional and within the ability of a person of ordinary skill in the art.

B. Mechanical Design

A mechanical rotating cam or other suitable mechanical drive system moves the moveable lens element groups 40B, 40C and 40D back and forth according to commands from a zoom lens adjustment module or program in the camera control computer. The mechanical design for the zoom lens drive system 42 of FIG. 1B is conventional and according to known servo and cam drive technology. The reader is directed to U.S. Pat. No. 5,616,173 to Kawasaki, U.S. Pat. No. 4,942,417 to Miyazawa, and U.S. Pat. No. 4,377,747, which are incorporated by reference herein, for further details on zoom lenses and systems for focussing a lens.

Camera Control System

Figure 4:
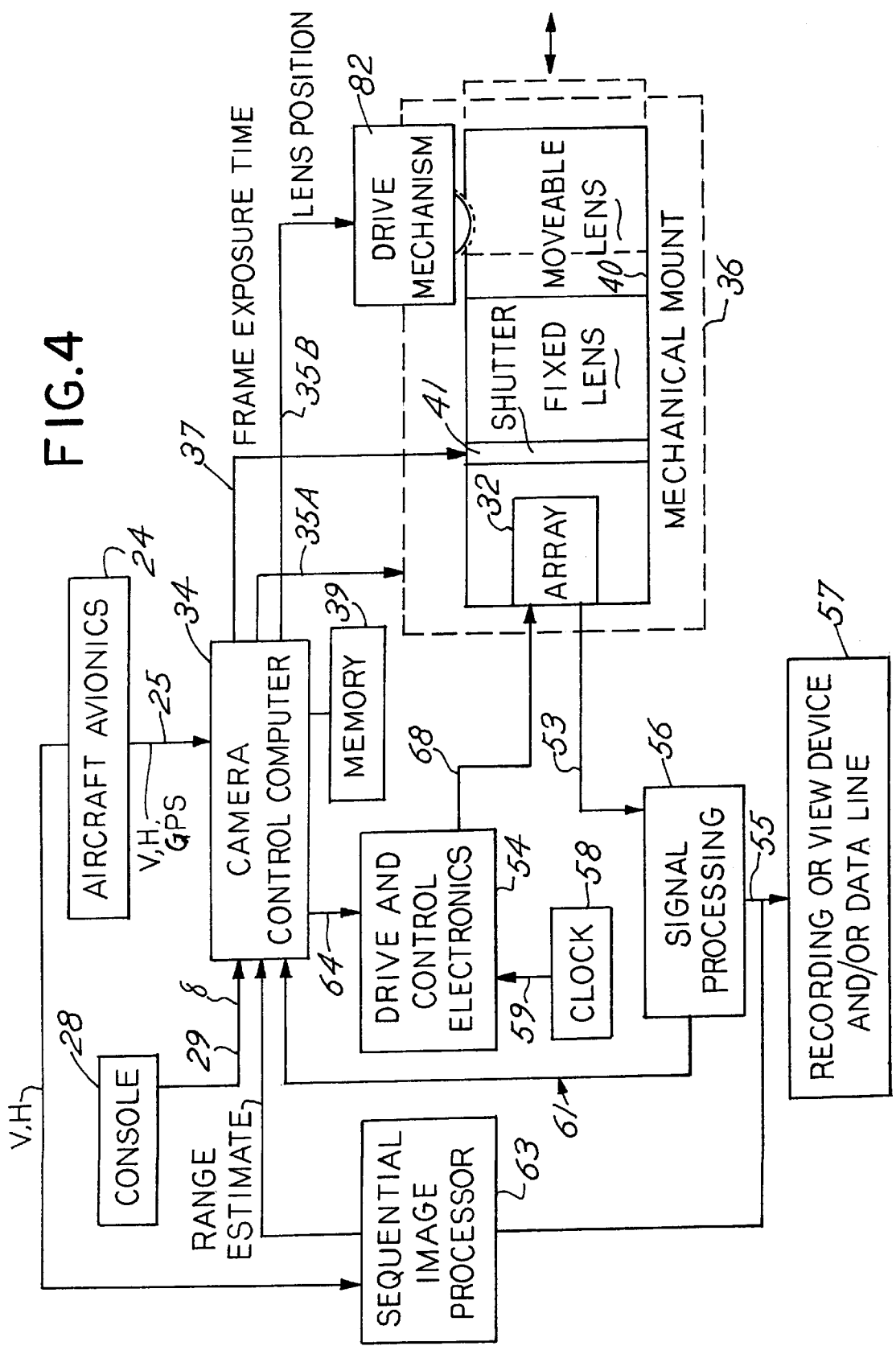
FIG. 4 is a block diagram of the camera control system and supporting electronics for the array (32).

In a preferred embodiment of the invention, the operation of the camera system of FIG. 1A is controlled by a camera control system shown in block diagram form in FIG. 4. The camera control system includes a main memory 39 storing pre-set camera system parameters and imagery goals to be obtained in the reconnaissance mission, such as field of view, GRD or NIIRS. The camera control system also includes the camera control computer 34 that processes navigation information for the aircraft navigation system and possibly range information and responsively generates commands for the array electronics and zoom lens drive mechanism along busses 35A and 35B and along bus 64. The camera control system further includes a sequential image processing circuit 63 that is used to generate range to scene data from sequential images generated by the array 32.

The camera control computer 34 determines commands for the zoom lens drive mechanism 42 based on current range or height and stand-off distance information, imagery goals to be achieved, and other factors discussed below. The zoom lens commands are send along bus 35B to the zoom lens drive mechanism 42, which moves the moveable zoom lens groups 40B, 40C and 40D of FIGS. 3A–3C to various positions in order to achieve the desired GRD or field of view.

The camera control system further includes supporting electronics and image processing circuitry 56 for the array 32 for purposes described below. The image processing circuit 56 includes A/D converters and automatic gain control circuitry, and sends a feedback signal to the camera control computer 34 along conductor 64 to control the exposure time. The drive and control electronics module 54 provides clock signals to the array 32 along conductor 68. The clock signals control the transfer of charge from one pixel element to another in the array 32. In an embodiment of the array in which image motion compensation is performed electronically, the drive and control electronics 54 takes the form of a set of counters and clock drivers, one for each column group in the array 32. The camera control computer issues a set of counter values to the counters based on calculated image motion rates at various portions of the array. When the shutter 41 opens, the counters start counting to the terminal counter value. When the terminal counter value is reached, the clock driver triggers a cycle of clocking, causing the pixels in the column group to shift from one row to another in the array. This process is described at length in the previous Lareau et al '597 and '602 patents and therefore will not be discussed further herein. The master clock 58 issues clock pulses to the drive and control electronics 54, which are used in the above counting process.

After the array has generated an image and the image has been converted into digital form in the signal processing module 56, the image is sent to a recording or viewing device 57 on board the aircraft, or alternatively, to a data line for downloading to a ground station. In a preferred embodiment, the image is also sent to the sequential image-processing module 63. The sequential image-processing module, described below, processes two sequential images to extract range to scene information and also provide more precise pixel information transfer rates that account for terrain variations within the field of view.

Persons skilled in the art will appreciate that the sequential image processing circuit 63 and zoom lens adjustment module can be either implemented as software modules in the camera control computer 34, as discrete digital circuits, or as a combination of the two. The sequential image processing circuit 63 is used for the correlation algorithm described previously to generate range information from sequential images generated by the array. In an embodiment of the invention in which the range information is obtained through active sensors or using other techniques, the sequential image processor circuit 63 need not be implemented.

Memory 39

The memory 39 of FIG. 4 stores information that is needed by the camera control computer 34 to calculate charge transfer rates for the array 32, and thus counter values for the drive and control electronics 54. Most of this information is predetermined for a given array and stored in a read only memory (ROM), and includes parameters such as the number of pixels in the column direction, the number of sectors or column groups, the pixel size, the clock frequency of the master clock 58, and the line read-out rate. These parameters, and the mathematics explaining their relationship to pixel information transfer rates for an array such as shown in FIG. 2 is known and described in the prior Lareau et al. '062 and '597 patents.

The memory 39 also includes a random access memory (RAM) that stores dynamic parameters used in the charge transfer rate or zoom lens position calculations described herein, such as the vehicle velocity, height, stand off range, location of the aircraft above the earth, obtained from the aircraft avionics system 24 over conductor 25. Additional information that is stored is the exposure time, and whether the camera is oriented in a forward oblique or side oblique position relative to the center axis of the aircraft. The camera depression angle $\delta_c$, may also be obtained from a console operated by the pilot (in a manned embodiment) or automatically from a sensor in the camera housing and stored in the memory 39.

The memory 39 also includes a portion, implemented as either RAM or ROM, in which information as to the imagery objectives for the reconnaissance mission are stored. For example, the reconnaissance mission may be to take six photographs of a certain airfield at a certain location on the earth's surface from an altitude of 15,000 feet and at a stand-off range of 10 miles, with the images being generated from a particular location above the earth's surface. The mission may require that all images of the air strip be of a field of view of at least 15 degrees. Thus, the memory would store information indicating that each of the six images must have a field of view of 15 degrees, the geographical coordinates of the airfield, the location of where the aircraft is supposed to be when the pictures are taken, the stand off range, and the expected height of the aircraft above the surface of the earth for each of the pictures. As another example, the mission commander could specify that images 1–6 must have a ground resolvable distance of at least 5 feet, and this information is stored in the memory. Of course, the reconnaissance mission may have multiple targets, each with its own objectives in terms of field of view, ground resolvable distance, or NIIRS value, and such objectives for each target will be stored in the memory. Additionally, the memory may store geographic coordinates for each target (or the geographic coordinates of the location of the aircraft when the images or the target are to be generated). In this fashion, the camera control system knows which target is to be imaged and can correctly retrieve the proper mission objectives for the imagery when the camera is about to generate the images.

These mission parameters are typically programmed into memory for the camera control computer shortly in advance of the mission. Alternatively, they can be dynamically up-linked into the memory while the aircraft is en route to the target using known communications equipment and interfaces.

The memory 39 also stores information for the target cuer program implemented in the camera control computer. This information typically consists of the desired field of view, GRD or NIIRS values for a given target recognized by the target cuer. This information is used by the camera control computer 34 and the zoom lens adjustment module to determine proper settings for the zoom lens 40 given the target that happens to be in the field of view. This information will also be typically loaded into the memory shortly prior to the mission.

Sequential Image Processor Circuit

Figure 5:
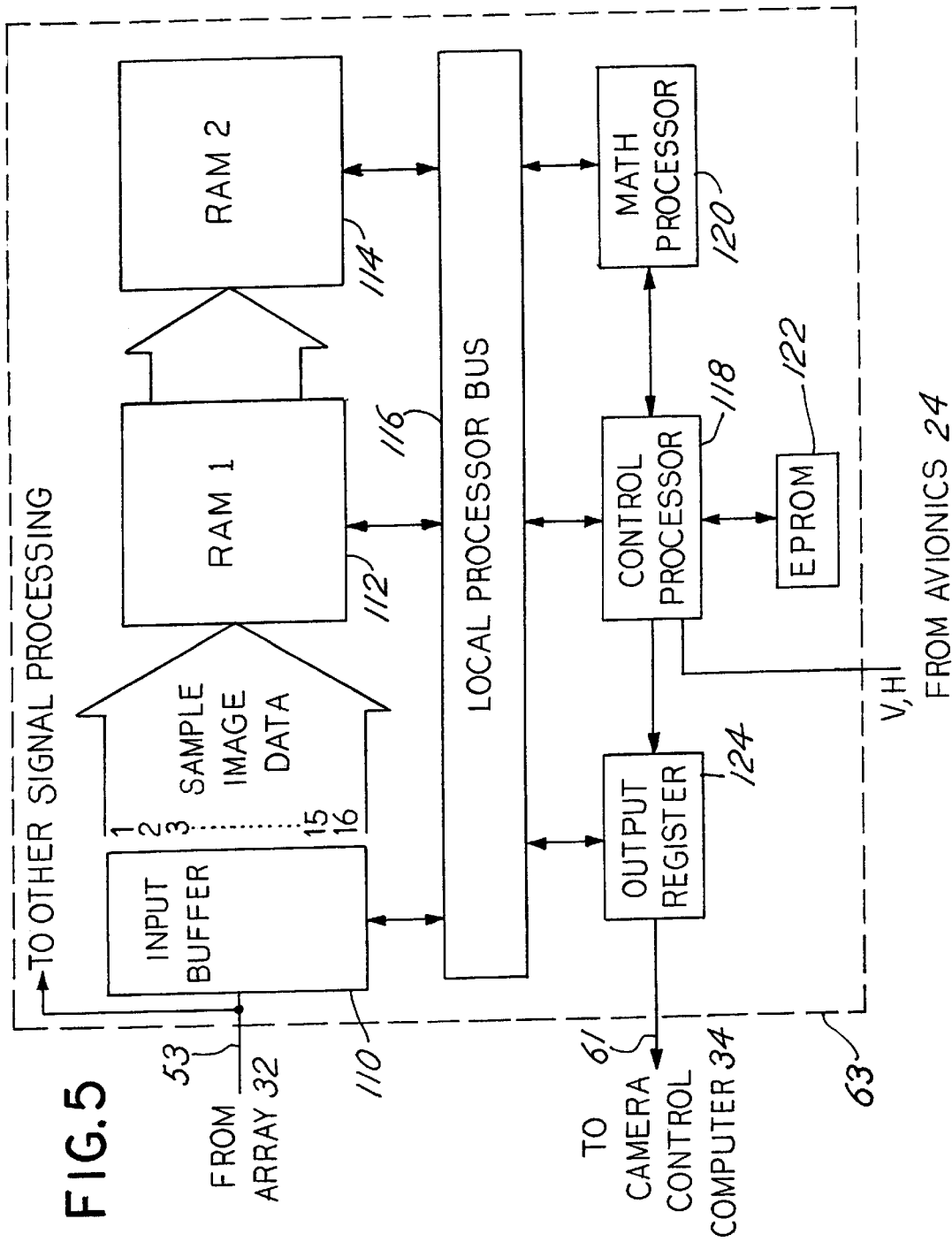
FIG. 5 is a block diagram of the architecture of the Sequential Image Processor of FIG. 4 illustrating the connectivity of the Control Processor, Math Processor, memory and input and output buffers.

The sequential image processing circuit 63 of FIG. 4 is shown in a block diagram form in FIG. 5. The circuit 63 receives sequential digital images from the signal processing module 56 along a bus 53. The images are sent to an input buffer 110. Sampled image data from the first image from the array is fed to a RAM memory unit 112. Sampled image data from the second image from the array is fed to a second RAM memory unit 114. The memory units 112 and 114 could of course be a single memory unit; two are shown for purposes of convenience of illustrating the correlation process for two sequential images. A local processor bus 116 passes commands between the various modules of the circuit 63.

The circuit 63 includes a control processor 118, a math co-processor, and EPROM 112 and an output register 124. The control processor 118 supervises the performance of the correlation algorithm described in the Lareau et al. '062 patent and receives velocity, height and other data as needed to compute image velocity and range information. The math co-processor performs the mathematically computationally intensive calculations. The EPROM 122 stores the software that contains the correlation algorithm. After the control processor 118 has performed the correlation processing of the sequential images for all the column groups of the array 32, digital signals representing updated charge transfer rates for all the column groups are fed to the output register 124 for transmission to the camera control computer 34. The updated charged transfer rates incorporate and adjustment factor that accounts for changes in image velocity due to terrain variations in the sectors of the array. Additionally, the control processor performs the range calculations pursuant to the range algorithms set forth in the Lareau et al. '062 patent, and loads range information into the output register 124. The range information could be either range computed for the center of the array, range for each of the column groups, range for a specified target in the field of view, or otherwise.

Zoom Lens Adjustment

Figure 6:
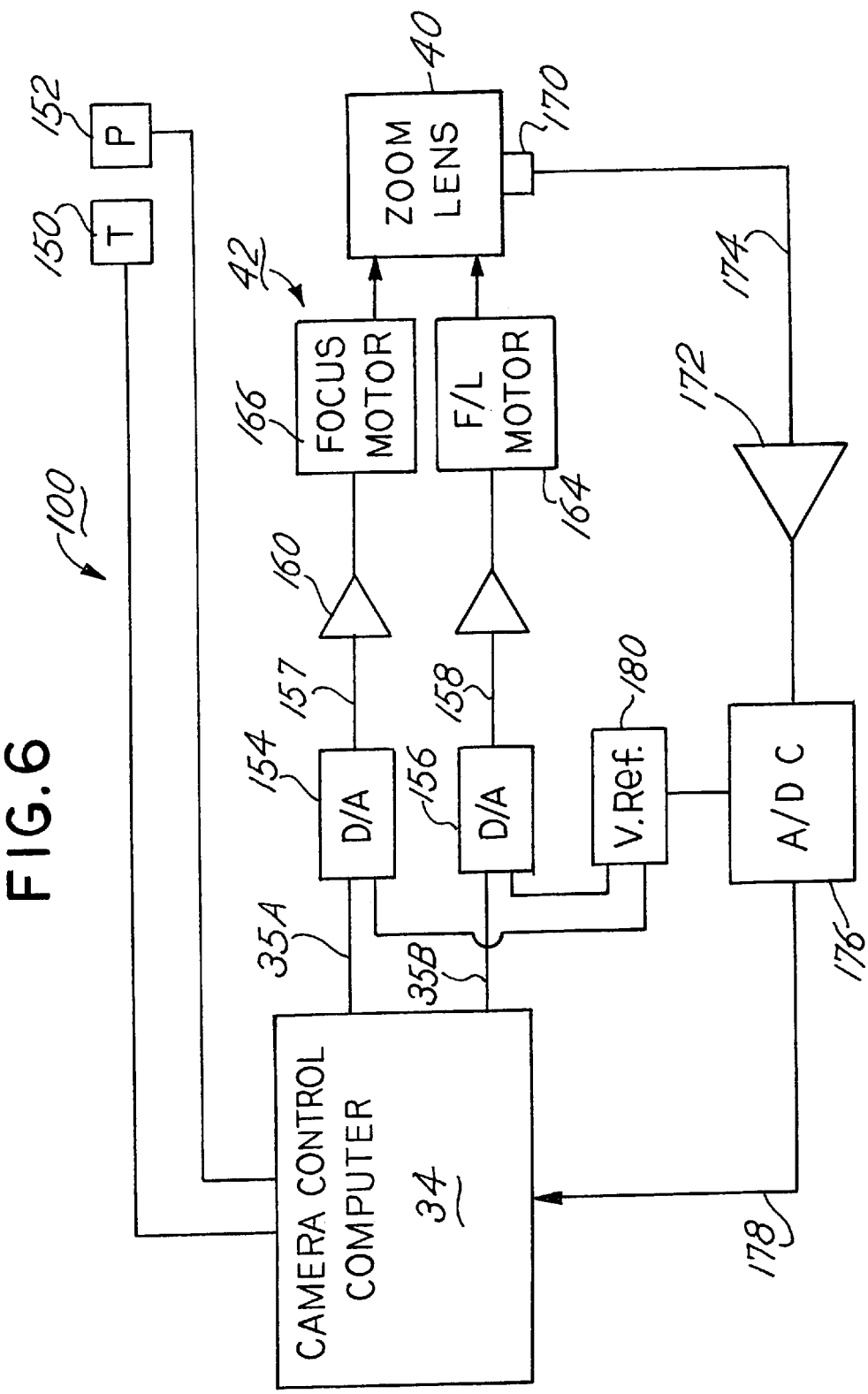
FIG. 6 is block diagram of the zoom lens adjustment module that calculates zoom lens positions based on range, vehicle information and the imagery objectives for the scene of interest.

Referring to FIG. 6, the camera control computer 34 implements a zoom lens adjustment algorithm (or, equivalently, circuit or program) to generate commands for the zoom lens adjustment mechanism 42 based on the current range information, desired FOV, GRD or NIIRS objectives of the image, and other parameters. The computer 34 generates commands for the focal length and focus adjustment motors of the zoom lens adjustment mechanism 42 to change the focal length and focus of the zoom lens 40 to the calculated values. An output signal from the camera control computer 34 is sent to the zoom lens control module indicated generally by reference numeral 100 in FIG. 6. The control module 100 adjusts the focal length and focus by simultaneously driving lens element groups 40B–40D (see FIG. 3) in the zoom lens 40. The focus is adjusted by independently moving the moveable lens element groups 40C and 40D. The focal length is adjusted by moving lens group 40B. Adjustment of the focus has a negligible effect on the focal length setting.

Temperature and pressure sensors 150 and 152 are incorporated within or in close proximity to the zoom lens. The output of these sensors are used by the camera control computer to modify commands sent to the lens control circuitry in order to correct the lens focus and focal length settings to compensate for the effects of localized pressure and temperature conditions.

A calibrated position sensor 170 is incorporated within the zoom lens 40. The position sensor 170 is mounted to work in conjunction with the moveable lens element group 40B (FIGS. 3A–3C) that is primarily responsible for zoom lens focal length. Its output is calibrated to indicate the focal length setting of the zoom lens based on the position of the lens element group 40B. The position sensor output signal is fed back to the control computer 34 where it is interpreted and compared with the calculated focal length setting. This signal verifies that the lens was indeed adjusted, and was set within the specified range. The addition of the position sensor creates a closed loop system, which confirms lens adjustment and acts as an error checking mechanism.

Although less accurate, the position loop formed between the position sensor 170 and the control computer 34 can also function as a lens control means should one or more of the vehicle navigational input parameters be erroneous or missing. The control computer can select this alternative "fail-safe" mode based on detection of invalid or lost input data. By using the mission target parameters stored in resident memory in conjunction with the vehicle altitude derived from the pressure sensor, the camera control computer can set the camera depression angle, calculate a range to target, and adjust the corresponding focal length of the lens. In this mode, imagery can still be obtained without sacrificing the mission. This feature is especially useful for UAV applications.

Turning now to the operation of the circuit or module 100 of FIG. 6, the camera control computer 34 receives the additional temperature and pressure inputs from the temperature sensor 150 and the pressure sensor 152. The lens focal length and focus adjustment commands issued by the camera control computer 34 are fed on busses 35A and 35B to a digital to analog converter 154 for focus and a digital to analog converter 156 for focal length. The converters 154 and 156 output differential analog signal on busses 157 and 158, respectively, corresponding to the desired focus and focal length adjustments for the zoom lens 40. These signals are fed to servo-motor drive amplifiers 160 and 162 which in turn drive the zoom lens focus motor 166 and the focal length motor 164 to the settings determined by the computer 34.

Referring also to FIGS. 3A–3C, the focus motor 166 moves lens groups 40C and 40D to control the focus, while the focal length motor 164 moves lens group 40B to control the focal length. Lens groups 40C and 40D move relative to lens group 40B and move independently with respect to each other resulting in par-focalization of the high quality image. A mechanical cam (not shown) inside the zoom lens 40 accomplishes the independent movement of lens groups 40C and 40D by the single servo motor 166.

The position sensor 170 integrated into the lens group 40B feeds a signal to a buffer amplifier 172 on bus 174, which sets the correct input level to drive the analog to digital converter (ADC) 176. The digital signal from the ADC 176 corresponding to the position sensor output is fed back to the control computer 34 on bus 178, where it is interpreted as the focal length setting of the lens. This creates a position loop between the lens 40 and the control computer 34. A common reference voltage source 180 is provided for the two digital to analog converters 154 and 156 and the ADC 176 to improve signal conversion accuracy.

Figure 7:
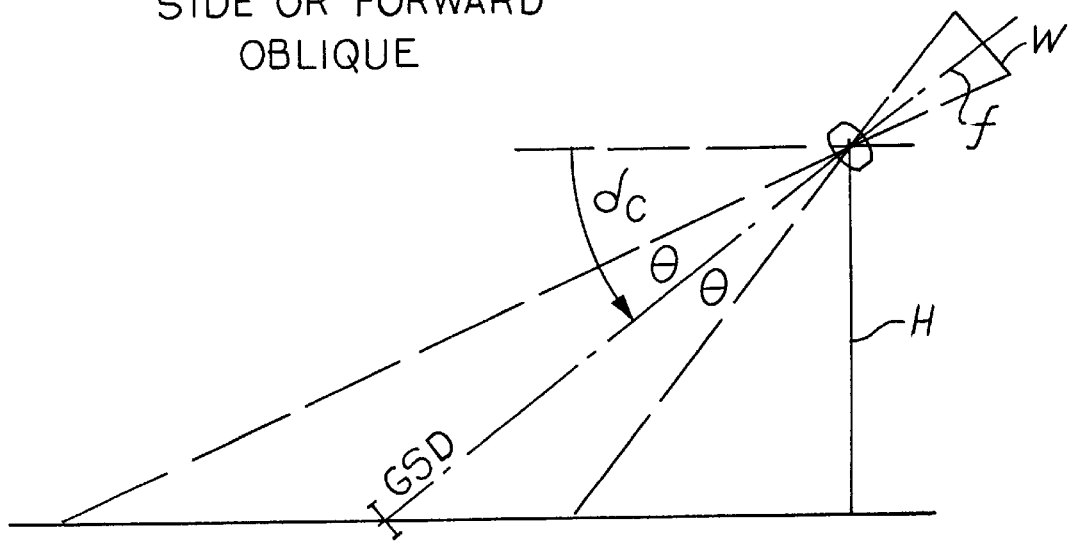
FIG. 7 is a schematic illustration of the geometry of known aircraft and camera parameters that are used to derive focal length position for the zoom lens of FIG. 1, given a desired value of image resolution in terms of ground resolvable distance (GRD) in the scene of interest.

The parameters for calculation of zoom lens position (i.e., focal length) for a given resolution objective is illustrated in FIG. 7. This figure shows schematically the lens 40 having a given focal length $f$, positioned in the aircraft at an altitude H above the earth's surface. W represents the width of the image-collecting portion of the array. GSD represents the ground solveable dimension, a measure of resolution, in units of feet. The parameter θ indicates one half the field of view angle. The parameter $\delta_c$ indicates the camera depression angle. The parameter Px indicates the pixel size in millimeters From the illustration in FIG. 7, it can be shown that the following relation holds at the center of the image format:

$$\frac{Px}{f} = \frac{(GSD)\sin\delta_c}{H} \tag{1}$$

Solving this equation for $f$ yields the following result:

$$f = \frac{Px(H)}{(GSD)\sin\delta_c} \tag{2}$$

The quantity H/sin $\delta_c$ is equal to the range to the scene. If resolution is stated in NIIRS units, the above results can be used with the NIIRS units converted to GRD values. For NIIRS, the approximation formula is as follows:

$$GRD = 10^{LOG\ 2\ (5.75-NIIRS)}$$

Equation (2) thus gives the focal length for the zoom lens 40 given a desired GRD, height, camera depression angle and pixel size. The height is aircraft navigation data received from the aircraft' GPS or other navigation system. The camera depression angle is data supplied to the camera control computer. Alternatively, range information can be used if either height or camera depression angle are not known. The pixel size is a predetermined parameter and stored in the system memory.

Figure 8:
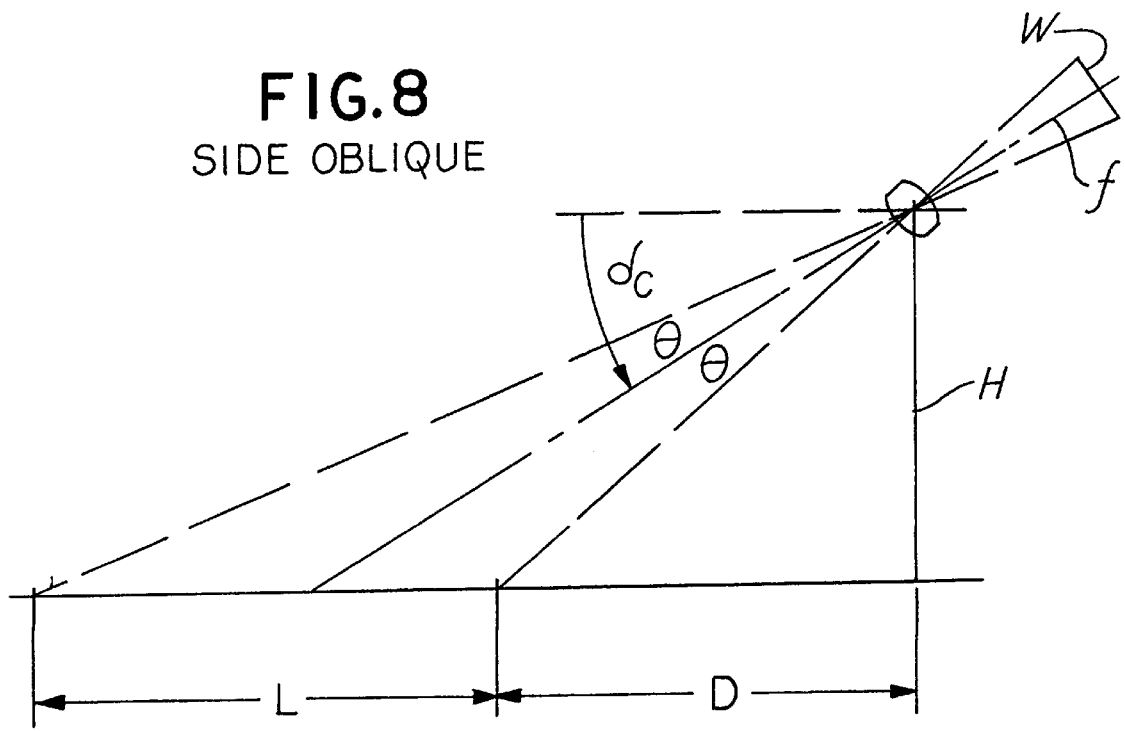
FIG. 8 is a schematic illustration of the geometry of aircraft and camera parameters that are used to derive focal length position and field of view for the zoom lens of FIG. 1, given a known value of the stand-off range D, length L of the terrain of interest transverse to the line of flight (assuming a flat earth), and aircraft height above ground.

Referring now to FIG. 8, for a given set of values of H, D, L and W, it is possible to find the focal length for the zoom lens and a camera depression angle to be assumed for the camera, and from there determine an associated field of view (FOV). From the Figure, the following relations apply:

$$\delta_c + \theta = \text{Arctan}\ (H/D) \tag{3}$$

$$\delta_c - \theta = \text{Arctan}\ (H/(D+L)) \tag{4}$$

It follows that the value of θ is given by:

$$\theta = \tfrac{1}{2}[\text{Arctan}\ (H/D) - \text{Arctan}\ (H/(D+L))] \tag{5}$$

where H is the aircraft height, D is the stand off distance to the near field of view, and L is the distance of the field of view along the earth's surface transverse to the line of flight, assuming a flat earth in the field of view. The value of H is derived from the aircraft navigation system. D will also be able to be determined from the aircraft navigation system or is otherwise predetermined, since the aircraft's position above the earth is data supplied from the navigation system and the latitude and longitude of the terrain of interest or target will also be known and stored in memory. Since range R to the center of the field of view=$[H^2+(D+\tfrac{1}{2}L)^2]^{1/2}$, and H and D are known, then L can be also derived if the range is known. Alternatively, L can be derived from the height and camera depression angle with an assumption that the earth is flat in the field of view.

The focal length of the camera lens can be expressed as a function of field of view:

$$f = W/(2\tan\theta) \tag{6}$$

Adding equations (3) and (4) and diving the result by 2 gives the value for the camera depression angle $\delta_c$ that needs to be assigned to the camera system in order to produce the desired resolution and field of view of the terrain of interest, given the above parameters:

$$\delta_c = \tfrac{1}{2}[\text{Arctan } (H/D) + \text{Arctan } (H/(D+L))] \quad (7)$$

Equations 5, 6 and 7 thus set for the procedure for deriving the focal length for a given field of view, and how to set the camera depression angle to generate imagery for the terrain of interest based on known mission and aircraft parameters. The zoom lens adjustment module for the camera controls system implements a software control program to determine focal length $f$ for the zoom lens based on the above procedure.

III. System Operation

The system of the type described above can perform a method of autonomously imaging a scene with a reconnaissance camera system in a manner so as to continuously generate successive images of said scene meeting field of view, resolution, or image interpretability rating objectives for the images. The system includes the aerial reconnaissance camera system 20 (FIG. 1A) installed on board a reconnaissance vehicle, including the electro-optical imaging detector array 32, a zoom lens system 40, and a camera control system 34, 39 for the array. For example, the mission may require that a ground resolvable distance objective of five feet be obtained for all images generated of the scene of interest. If the aircraft were to increase its altitude significantly from an expected flight path, for example, due to a hostile threat from the ground, or decrease its altitude significantly due to the presence of clouds, the change in vehicle altitude (and resulting changes in range to target) will significantly affect the field of view or GRD unless dynamic adjustment of the zoom lens occurs. In accordance with a significant aspect of the invention, this dynamic adjustment is made autonomously, without operator involvement.

When the reconnaissance vehicle 22 has flown to the area of interest and is in position such that the field of view of the camera system includes the target of interest, range to target or height H and stand-off range D information is obtained. If the target's position is know known, range information is obtain, preferably in a passive manner. A preferred method includes the steps of generating first and second successive images of the scene with the imaging detector array 32 and storing the images in a memory system such as RAMs 112 and 114 of the sequential image processor circuit 63 of FIG. 5. Vehicle altitude and attitude information is also supplied to the camera control system from the navigation system on board the aerial reconnaissance vehicle. The camera control system performs a correlation algorithm on the first and second successive images to determine how much a given portion of the terrain has moved in the plane of the array between the successive images. The camera control system (i.e., the sequential image processor circuit 63) then uses this information, together with vehicle velocity and height information, to generate range information between the imaging detector array and the scene. This procedure of obtaining range information passively from sequential images from a moving platform is thoroughly described in the Lareau et al. '062 patent. For the sake of brevity the detailed discussion is omitted from this document and the reader is directed to the '062 patent for further details.

After the range to target information (or the aircraft height and stand off range information) is acquired, the process continues with the camera control computer 34 retrieving from the camera control system memory 39 information as to field of view, resolution, or image interpretability rating objectives for imagery to be generated.

The camera control computer 34 then processes the information as to field of view, resolution, or image interpretability rating objectives, together with the values of range R and/or values of H, D, and L and $\delta_c$, to generate commands for a zoom lens drive system 40 (FIG. 1B). This calculation is performed in the zoom lens adjustment module or the computer 34 and has been described previously. The focal length of the zoom lens 40 is adjusted such that field of view, resolution, or image interpretability rating objectives are achieved given the current vehicle altitude and attitude information supplied by said navigation system and the range to target information.

The imaging detector array 32 may then be exposed again to the scene to thereby generate a second image of the scene. If the passive range finding technique is used based on correlation of first and second images, then the image is the third image in a sequence of images. The process continues in an iterative procedure, in which each successive image generated by the camera system incorporates range to target information obtained from the previous two frames of imagery and current velocity and height data. Based on the mission objectives for the imagery stored in memory, the zoom lens 40 is continually adjusted between successive frames of imagery to achieve the field of view, resolution, or ground-resolvable distance objectives without real-time operator involvement. Additionally, by virtue of the use of real time range, velocity and height information, the method compensates for changes in attitude or position of the reconnaissance vehicle relative to the scene between initial expected values of attitude and position and the actual altitude and position. This feature gives the pilot or UAV the ability to dynamically account for atmospheric conditions or hostile threats while meeting the mission objectives.

If during the generation of successive images the target cuer detects the presence of particular target types in the field of view, new inputs as to GRD or field of view may be supplied to the zoom lens adjustment module and new focal length settings implemented.

It will thus be appreciated that we have described a method of autonomously imaging a scene with a reconnaissance camera system in a manner so as to continuously generate successive images of the scene meeting field of view, resolution, or ground-resolvable distance objectives for the images. The method comprises the steps of:

(a) supplying either range-to-target aircraft height and stand-off distance information to the camera control system;

(b) retrieving from a memory information as to field of view, resolution, or image interpretability rating objectives for imagery to be generated by the imaging array;

(c) processing the information as to field of view, resolution, or image interpretability rating objectives, together with the range or height and stand-off distance information, to generate settings for the zoom lens so as have a focal length such that an image generated by the array will achieve the field of view, resolution, or image interpretability rating objectives;

(d) adjusting the focal length of the zoom lens in accordance with step (c) and (e) exposing the imaging array to the scene;

whereby the image achieves the field of view, resolution, or ground-resolvable distance objectives without real-time operator involvement.

Preferably, the steps (a)–(e) are performed in a series of cycles with the aircraft flying past or toward the terrain of interest, thereby generating successive images of the scene meeting the field of view, resolution, or image interpretability rating objectives while compensating for changes in vehicle attitude and altitude between the performance of the cycles. In a preferred embodiment, where the geographic location of the target in the scene is not known in advance and standoff distance cannot be known precisely, the range information is determined in a passive manner by a correlation algorithm applied to successive frames of imagery of the scene stored in a memory.

For example, the camera control computer, zoom lens and imaging array are operated to generate a third successive image of the scene. The zoom lens adjustment circuit or module operates the zoom lens, based on range information from the first and second images, to have a focal length such that the third image meets the field of view, resolution, or image interpretability rating objectives. By obtaining actual range information from the previous images, and using this information to command the zoom lens, the third image may be generated to compensate for changes in the altitude or attitude of the reconnaissance vehicle from an previously expected path. The field of view, resolution, or image interpretability rating objectives can thus be achieved without real-time operator involvement.

It will be appreciated that the method can be performed in a conventional, manned reconnaissance vehicle, such as shown in FIG. 1A, or in an unmanned vehicle or UAV. A preferred embodiment would be performing the method in a long range UAV, in which the camera control system, array, zoom lens etc. are installed in the long range UAV. The UAV is programmed to fly to a certain geographic area and generate a series of images of a target with GRD, FOV or IIRS objectives. These objectives are stored in the memory 39. A target cuer implemented in the camera control computer 34 processes imagery generated by the array. When the target cuer detects the target for the reconnaissance mission, the appropriate GRD, FOV or IIRS objective is retrieved from the memory. The camera control computer or zoom lens adjustment module operates the zoom lens to have the appropriate focal length for the images in accordance with the procedures described herein. As the unmanned vehicle flies by the target, a series of images is produced meeting the objectives. The use of actual range information allows the objectives to be achieved even if the UAV deviates from its expected flight path while imaging the target. No up-link to control the zoom lens is required. The UAV then either stores the images generated by the array on-board, or relays them in real time to a ground station for immediate use.

IV. Further Considerations

Various alternative architectures for the array 32 are possible. One possibility is that the array is organized into a plurality of rectangular cells, with each cell assigned a separate charge transfer rate for image motion compensation. The drive and control electronics of the camera control system further comprises counter and clock driver circuitry for transferring pixel information in each of the cells in both the row direction and a column direction in substantial synchronism with an image motion having both row and column components, so as to achieve image motion compensation for image motion having components in both the row direction and in the column direction. This technique allows the array to compensate for roll, pitch and yaw motions of the aircraft during the exposure of the array. The technique is described in the pending application of Andre G. Lareau et al. Ser. No. 08/646,509, now allowed, U.S. Pat. No. 5,798,786.

The array may also take various forms, including a single monolithic detector or a composite or combination of smaller array elements pieced together in a mosaic fashion. The array may consist of charge-coupled devices, charge-injection devices, C-MOS detectors, and photo-diode arrays.

As noted earlier, many of the modules or circuits in the camera control system may be implemented as software in the camera control computer, in discrete hardware, or in a combination of the two. Such different forms of implementation are considered equivalent to each other and within the spirit and scope of the invention. Further, many of the drive and control electronics for the array can be implemented as analog or digital electronic circuits, in software, or otherwise. Such details are also considered equivalent to the methods and circuits described herein.

The manner in which image motion compensation is performed in the array is not particularly important. While we have described herein several methods for the sake of completeness of the disclosure of the applicants' currently contemplated best mode, such details may vary depending on the nature of the imaging array and whether mechanical forward motion compensation techniques are implemented.

This true spirit and scope of the invention is to be determined from the appended claims, as interpreted in light of the foregoing specification. Further, to the extent that the claims use the phrase "means for . . . ", it is intended to invoke the provisions of 35 U.S.C. §112, ¶6, in which the literal scope of such element in the claim is to be construed to cover the structures, materials or acts described in this specification, and all equivalents thereof.

What is claimed is:

1. An autonomous aerial reconnaissance camera system for imaging a scene of interest suitable for carriage by a reconnaissance vehicle, comprising:

(a) an electro-optical imaging detector array comprising a plurality of pixel elements arranged in rows and columns;

(b) a zoom lens system, comprising a zoom lens for imaging a scene external of said reconnaissance vehicle onto said imaging detector array and a drive system for adjusting the focal length of said zoom lens; and (c) a camera control system for said imaging array and said zoom lens system, comprising:

i.) a memory storing information as to field of view, resolution, or image interpretability rating objectives for imagery to be generated by said imaging array; and ii.) a camera control computer for receiving (a) aircraft navigation data generated by a navigation system on-board said reconnaissance vehicle and (b) either range-to-scene information or aircraft height and stand-off distance data for said scene of interest, and responsively generating commands for said imaging array, iii.) said camera control system further comprising a zoom lens adjustment module generating commands for said drive system for said zoom lens to adjust said focal length of said zoom lens from said range-to-scene information or aircraft height and stand-off distance data and said information stored in said memory;

(d) said camera control computer, zoom lens, and electro-optical imaging detector array cooperating to generate an image meeting said field of view, resolution, or image interpretability rating objectives and enabling said field of view, resolution, or ground-resolvable distance objectives to be obtained without real-time operator involvement.

2. The system of claim 1, wherein camera control system further comprises a memory means for storing first and second successive images of said scene, and wherein said range-to-scene information is obtained by a sequential image processor circuit, said sequential image processor circuit executing a correlation algorithm on said first and second successive images to generate range information between said imaging detector array and said scene.

3. The system of claim 2, wherein said camera control computer, zoom lens and imaging array are operated to generate a third successive image of said scene, said zoom lens adjustment circuit operating said zoom lens to have a focal length such that said third image meets said field of view, resolution, or image interpretability rating objectives and enabling said field of view, resolution, or image interpretability rating objectives to be achieved without real-time operator involvement.

4. A method of autonomously imaging a scene with a reconnaissance camera system in a manner so as to continuously generate successive images of said scene meeting field of view, resolution, or image interpretability rating objectives for said images, said aerial reconnaissance camera system installed on board a reconnaissance vehicle and comprising a electro-optical imaging array, a zoom lens, and a camera control system for said array, comprising the steps of:

a) generating first and second successive images of said scene with said electro-optical imaging array and storing said images in a sequential image processing circuit;

b) supplying vehicle information to said camera control system from a navigation system on board said aerial reconnaissance vehicle and responsively correlating said first and second successive images to generate range information between said imaging array and said scene;

c) retrieving information stored in said camera control system as to field of view, resolution, or image interpretability rating objectives for imagery to be generated by said imaging sensor;

d) processing said information as to field of view, resolution, or image interpretability rating objectives, together with said range information derived from correlation of said first and second images and navigation information for said reconnaissance vehicle, to generate commands for a zoom lens drive system so as to adjust the focal length of said zoom lens such that said field of view, resolution, or image interpretability rating objectives are achieved; and e) exposing said imaging array to said scene to thereby generate a third successive image, whereby said third successive image achieves said field of view, resolution, or ground-resolvable distance objectives without real-time operator involvement, and while compensating for changes in attitude and altitude of said reconnaissance vehicle between initial expected values of said attitude and attitude during exposure of said array to said scene and the actual altitude and attitude of said reconnaissance vehicle when said array is exposed to said scene.

5. A method of autonomously imaging a scene with a reconnaissance camera system in a manner so as to continuously generate successive images of said scene meeting field of view, resolution, or ground-resolvable distance objectives for said images, said aerial reconnaissance camera system installed on board a reconnaissance vehicle and comprising a electro-optical imaging array, a zoom lens, and a camera control system for said array, the method comprising the steps of:

(a) supplying navigation and range-to-target information to said camera control system;

(b) retrieving from a memory information as to field of view, resolution, or image interpretability rating objectives for imagery to be generated by said imaging array;

(c) processing said information as to field of view, resolution, or image interpretability rating objectives, together with said range information, to generate settings for said zoom lens so as have a focal length such that an image generated by said array will achieve said field of view, resolution, or image interpretability rating objectives;

(d) adjusting the focal length of said zoom in accordance with step (c), and (e) exposing said imaging sensor to said scene;

whereby said image achieves said field of view, resolution, or ground-resolvable distance objectives without real-time operator involvement and compensates for changes in attitude and altitude of said reconnaissance vehicle between initial expected values of said attitude and attitude during exposure of said array to said scene and the actual altitude and attitude of said reconnaissance vehicle when said array is exposed to said scene.

6. The method of claim 5 wherein steps (a)–(e) are performed in a series of cycles, thereby generating successive images of said scene meeting said field of view, resolution, or image interpretability rating objectives while compensating for changes in vehicle attitude and altitude between the performance of said cycles.

7. The method of claim 5, wherein said range information is determined by a correlation algorithm applied to successive frames of imagery of said scene stored in a memory, whereby said range information is determined in a passive manner.

8. An unmanned aerial reconnaissance system capable of generating successive images of a scene meeting field of view, resolution, or image interpretability objectives without real-time operator involvement, comprising:

A. a reconnaissance vehicle having a navigation system and a means of propulsion capable of flying said vehicle in a reconnaissance mission without on-board human operation; and B. an aerial reconnaissance camera system installed aboard said vehicle, comprising:

an electro-optical imaging array comprising an array of pixel elements arranged in a plurality of rows and columns;

a zoom lens system, comprising a zoom lens for imaging a scene external of said aircraft onto said imaging array and a drive system for adjusting the focal length of said zoom lens; and a camera control system for said imaging array and said zoom lens system, comprising:

i.) a memory storing information as to field of view, resolution, or image interpretability rating objectives for imagery to be generated by said imaging array; and ii.) a camera control computer for receiving (a) aircraft navigation generated by said navigation system and (b) either range-to-scene information from a source of range information on board said aircraft or aircraft stand-off distance to said scene and aircraft height data, iii.) said camera control system further comprising a zoom lens adjustment circuit generating commands for said drive system for said zoom lens to adjust said focal length of said zoom lens in response to said either said range-to-scene information or said aircraft stand-off distance and aircraft height data, and navigation inputs received by said camera control computer and said information stored in said memory, iv.) said commands for said drive system for said zoom lens accounting for changes in attitude and altitude of said reconnaissance vehicle between initial expected values of said attitude and altitude during exposure of said array to said scene and the actual altitude and attitude of said reconnaissance vehicle when said array is to be exposed to said scene;

said camera control computer, zoom lens adjustment circuit, zoom lens and electro-optical imaging array cooperating to generate an image from said imaging array meeting said field of view, resolution, or image interpretability rating objectives without regard to said changes in altitude or attitude of said reconnaissance vehicle, whereby said image having said field of view, resolution, or ground-resolvable distance objectives may be obtained without real-time operator involvement either on-board said reconnaissance vehicle or through an up-link to said reconnaissance vehicle.

9. The system of claim 8, wherein said camera control system further comprises a memory means for storing first and second successive images of said scene generated by said imaging array, and wherein said range-to-scene information is obtained by a sequential image processor circuit, said sequential image processor circuit executing a correlation algorithm on said first and second successive images to generate range information between said imaging array and said scene.

10. The system of claim 9, wherein said camera control computer, zoom lens and imaging array are operated to generate a third successive image of said scene, said zoom lens adjustment circuit operating said zoom lens to have a focal length such that said third image meets said field of view, resolution, or image interpretability rating objectives without regard to said changes in altitude or attitude of said reconnaissance vehicle, and enabling said field of view, resolution, or image interpretability rating objectives to be achieved without real-time operator involvement.

11. The system of claim 8, wherein said reconnaissance vehicle comprises a long range UAV.

12. The system as claimed in one of claims 1 or 8, wherein said imaging array is organized into a plurality of column groups and wherein said camera control system further comprises a means for determining image motion rates in a column direction of said array for a plurality of locations in said array, and wherein said imaging array further comprises a means for transferring pixel information in said column groups in said column direction independently so as to compensate for different rates of image motion at said imaging sensor when said imaging sensor is oriented in a side-oblique orientation relative to said reconnaissance vehicle.

13. The method as claims in one of claims 4 or 5, wherein said imaging array is organized into a plurality of column groups and wherein said camera control system further comprises a means for determining image motion rates in a column direction of said array for a plurality of locations in said array, and wherein said imaging array further comprises a means for transferring pixel information in said column groups in said column direction independently so as to compensate for different rates of image motion at said imaging sensor when said imaging sensor is oriented in a side-oblique orientation relative to said reconnaissance vehicle.

14. The system as claimed in one of claims 1 or 8, wherein said imaging array is selected from the group of imaging devices consisting of charge-coupled devices, charge-injection devices, C-MOS detectors, and photo-diode arrays.

15. The method as claimed in one of claims 4 or 5, wherein said imaging array is selected from the group of imaging devices consisting of charge-coupled devices, charge-injection devices, C-MOS detectors, and photo-diode arrays.

16. The system as claimed in one of claims 1 or 8, wherein said array is organized into a plurality of cells, and wherein said camera control system further comprises a means, responsive to said navigation information, for transferring pixel information in each of said cells in both a row direction and a column direction in substantial synchronism with an image motion having both row and column components, so as to achieve image motion compensation for image motion having components in both said row direction and said column direction.

17. The method as claimed in one of claims 4 or 5, wherein said array is organized into a plurality of cells, and wherein said camera control system further comprises a means, responsive to said navigation information, for transferring pixel information in each of said cells in both a row direction and a column direction in substantial synchronism with an image motion having both row and column components, so as to achieve image motion compensation for image motion having components in both said row direction and said column direction.

18. The method as claimed in one of claims 4 or 5, wherein said camera control system further comprises a target cuer processing images generated by said array to identify a target in the field of view of said array, said target associated with a predetermined field of view, resolution or image interpretability objective, and wherein said commands for said drive system of said zoom lens are determined such that the field of view, resolution or image interpretability objectives of imagery for said target is achieved.

19. The system as claimed in one of claims 1 or 8, wherein said camera control system further comprises a target cuer processing images generated by said array to identify a target in the field of view of said array, said target associated with a predetermined field of view, resolution or image interpretability objective, and wherein said commands for said drive system of said zoom lens are determined such that the field of view, resolution or image interpretability objectives of imagery for said target is achieved.

20. A method for imaging a scene of interest with an aerial reconnaissance camera system installed in an aircraft, said system comprising a camera control computer having a computer memory, an imaging array and a zoom lens, comprising the steps of:

a) storing in the camera control computer memory GRD (Ground Resolvable Distance), NIIRS (National Image Interpretability Rating Scale) or field of view objectives for imagery of the scene of interest;

b) deriving information as to the aircraft height and position relative to the scene of interest;

c) calculating a focal length setting for a zoom lens for the array to meet the GRD, NIIRS or field of view objectives for imagery of the scene from information as to the aircraft's position relative to the scene obtained in step b) and the imagery objectives for said scene;

d) adjusting the focal length of the zoom lens in accordance with the calculations made in step c); and (e) exposing the array to the scene to generate an image of the scene of interest, whereby the image meets the objectives for the imagery.

21. The method of claim 20, further comprising the steps of exposing the array to the scene of interest in a series of exposures, each successive image meeting the GRD, NIIRS or field of view objectives for the scene of interest.

22. The method of claim 21, further comprising the steps of processing said successive images by a target cuer, determining whether a particular class of target is present in said scene, and responsively adjusting the focal length of said zoom lens to meet GRD, NIIRS or field of view objectives associated with said particular class of target if said particular class of target is present in said scene.

* * * * *